(12) United States Patent
Kim et al.

(10) Patent No.: US 11,029,797 B2
(45) Date of Patent: Jun. 8, 2021

(54) ELECTRONIC DEVICE AND METHOD FOR CONTROLLING PRESSURE INPUT

(71) Applicant: Samsung Electronics Co., Ltd., Suwon-si (KR)

(72) Inventors: Na-Young Kim, Seoul (KR);
Dae-Hwan Kim, Suwon-si (KR);
Seung-Wook Nam, Bucheon-si (KR);
Kwang-Tai Kim, Yongin-si (KR);
Hyung-Sup Byeon, Suwon-si (KR);
Cheol-Ho Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/614,138

(22) PCT Filed: Jun. 11, 2018

(86) PCT No.: PCT/KR2018/006600
§ 371 (c)(1),
(2) Date: Nov. 15, 2019

(87) PCT Pub. No.: WO2018/230905
PCT Pub. Date: Dec. 20, 2018

(65) Prior Publication Data
US 2020/0150828 A1 May 14, 2020

(30) Foreign Application Priority Data
Jun. 13, 2017 (KR) .................. 10-2017-0074347

(51) Int. Cl.
*G06F 3/044* (2006.01)
*G06F 3/041* (2006.01)
(Continued)

(52) U.S. Cl.
CPC .......... *G06F 3/0447* (2019.05); *G06F 3/0416* (2013.01); *G06F 3/0482* (2013.01); *G06F 3/0488* (2013.01); *G06F 3/04842* (2013.01)

(58) Field of Classification Search
CPC .... G06F 3/0447; G06F 3/0416; G06F 3/0482; G06F 3/0488; G06F 3/041; G06F 2203/04104; G06F 2203/04105
See application file for complete search history.

(56) References Cited

U.S. PATENT DOCUMENTS

| 8,378,798 | B2 * | 2/2013 | Bells ........................ G06F 3/016 340/407.2 |
| 9,632,581 | B2 * | 4/2017 | Ullrich .................... G06F 3/016 |

(Continued)

FOREIGN PATENT DOCUMENTS

| KR | 10-2011-0088930 A | 8/2011 |
| KR | 10-1071165 B1 | 10/2011 |

(Continued)

*Primary Examiner* — Sardis F Azongha
(74) *Attorney, Agent, or Firm* — Jefferson IP Law, LLP

(57) ABSTRACT

An electronic device according to various embodiments of the present invention comprises: a housing including a first plate and a second plate spaced apart from the first plate; a touch screen display disposed inside the housing and exposed through a part of the first plate; a pressure sensing circuit disposed between the first plate and the second plate, and configured to detect pressure caused by an external pressure applied to at least a part of the touch screen display; a wireless communication circuit disposed inside the housing; at least one processor disposed inside the housing and electrically connected to the touch screen display, the pressure sensing circuit, and the wireless communication circuit; and a memory disposed inside the housing and electrically connected to the processor, wherein the memory is configured to store an application program including a user interface and instructions, wherein the instructions are config- (Continued)

ured to cause the processor to, when executed, display at least one object on the user interface on the touch screen display, detect a pressure level for a user input in the at least one object or in the periphery thereof by using the pressure sensing circuit, and select one of a plurality of operations, related to the at least one object, on the basis of at least one part of the detected pressure level. Other embodiments are also possible.

20 Claims, 22 Drawing Sheets

(51) Int. Cl.
*G06F 3/0484* (2013.01)
*G06F 3/0488* (2013.01)
*G06F 3/0482* (2013.01)

(56) References Cited

U.S. PATENT DOCUMENTS

| | | | |
|---|---|---|---|
| 9,880,735 B2* | 1/2018 | Dascola | G06F 3/04845 |
| 2011/0187655 A1 | 8/2011 | Min et al. | |
| 2012/0105358 A1 | 5/2012 | Momeyer et al. | |
| 2012/0147052 A1* | 6/2012 | Homma | G06F 3/04886 |
| | | | 345/660 |
| 2016/0188181 A1* | 6/2016 | Smith | G06F 3/016 |
| | | | 715/765 |
| 2016/0259412 A1 | 9/2016 | Flint et al. | |
| 2017/0160864 A1* | 6/2017 | Lee | G06F 3/044 |
| 2017/0277385 A1* | 9/2017 | Muller | B60K 37/06 |
| 2018/0107276 A1* | 4/2018 | Heubel | G06F 3/04883 |

FOREIGN PATENT DOCUMENTS

| | | |
|---|---|---|
| KR | 10-2012-0039849 A | 4/2012 |
| KR | 10-2013-0088861 A | 8/2013 |
| KR | 10-2014-0089224 A | 7/2014 |
| KR | 10-2017-0029757 A | 3/2017 |
| KR | 10-1714207 B1 | 3/2017 |

* cited by examiner

ELECTRONIC DEVICE AND METHOD FOR CONTROLLING PRESSURE INPUT

CROSS-REFERENCE TO RELATED APPLICATIONS

This application is a U.S. National Stage application under 35 U.S.C. § 371 of an International application filed on Jun. 11, 2018 and assigned application number PCT/KR2018/006600, which claimed the priority of a Korean patent application filed on Jun. 13, 2017 in the Korean Intellectual Property Office and assigned Serial number 10-2017-0074347, the entire disclosure of which is hereby incorporated by reference.

TECHNICAL FIELD

The disclosure generally relates to an electronic device and a method for controlling an operation of an electronic device according to a pressure input.

BACKGROUND ART

Recently, various services and additional functions provided by electronic devices have been gradually expanded. In order to increase the practical value of electronic devices and meet various demands of users, communication service providers or electronic device manufacturers provide a greater variety of functions and competitively develop electronic devices so as to differentiate the same from those of other companies.

On the strength of such technology development, such electronic devices provide various services such as augmented reality and three-dimensional (3D) maps through various applications.

DETAILED DESCRIPTION OF THE INVENTION

Technical Problem

An electronic device may overlappingly display a plurality of objects on a screen in order to provide much information through the screen. However, when objects are overlappingly displayed in, for example, augmented reality or a 3 dimensional (D) map, it is not possible to precisely and finely select or control the overlapping objects and it is not possible to rapidly acquire information on the objects.

Various embodiments of the disclosure may provide various pieces of information or functions of objects by detecting an input based on a pressure level.

Technical Solution

Various embodiments of the disclosure relate to an electronic device and a method for controlling an operation of the electronic device according to a level of a pressure input.

In accordance with an aspect of the disclosure, an electronic device is provided. The electronic device includes: a housing comprising a first plate and a second plate separated from the first plate; a touch screen display disposed within the housing and exposed through a portion of the first plate; a pressure detection circuit disposed between the first plate and the second plate and configured to detect pressure by external pressure applied to at least a portion of the touch screen display; a wireless communication circuit disposed within the housing; at least one processor disposed within the housing and electrically connected to the touch screen display, the pressure detection circuit, and the wireless communication circuit; and a memory disposed within the housing and electrically connected to the processor, wherein the memory is configured to store an application comprising a user interface and instructions, wherein the instructions are configured to cause the processor to, when executed, display at least one object in the user interface on the touch screen display, detect a pressure level of a user input on or around the at least one object through the pressure detection circuit, and select one of a plurality of operations related to the at least one object, based on at least a portion of the detected pressure level.

In accordance with another aspect of the disclosure, a method of controlling an operation according to a level of a pressure input by an electronic device is provided. The method includes: displaying at least one object in a user interface on a touch screen display of the electronic device; detecting a pressure level of a user input on or around the at least one object; and selecting one of a plurality of operations related to the at least one object, based on at least a portion of the detected pressure level.

In accordance with another aspect of the disclosure, a computer-readable storage medium for storing a program including instructions to control an operation according to a level of a pressure input in an electronic device is provided. The computer-readable storage medium includes: a first instruction set for displaying at least one object in a user interface on a touch screen display of the electronic device; a second instruction set for detecting a pressure level of a user input on or around the at least one object; and a third instruction set for selecting one of a plurality of operations related to the at least one object, based on at least a portion of the detected pressure level.

Advantageous Effects

According to various embodiments of the disclosure, it is possible to accurately select or control overlappingly displayed objects by variously controlling an operation of an electronic device according to a pressure level and to provide convenience to a user by rapidly acquiring and displaying information on the selected object.

MODE FOR CARRYING OUT THE INVENTION

Figure 1:
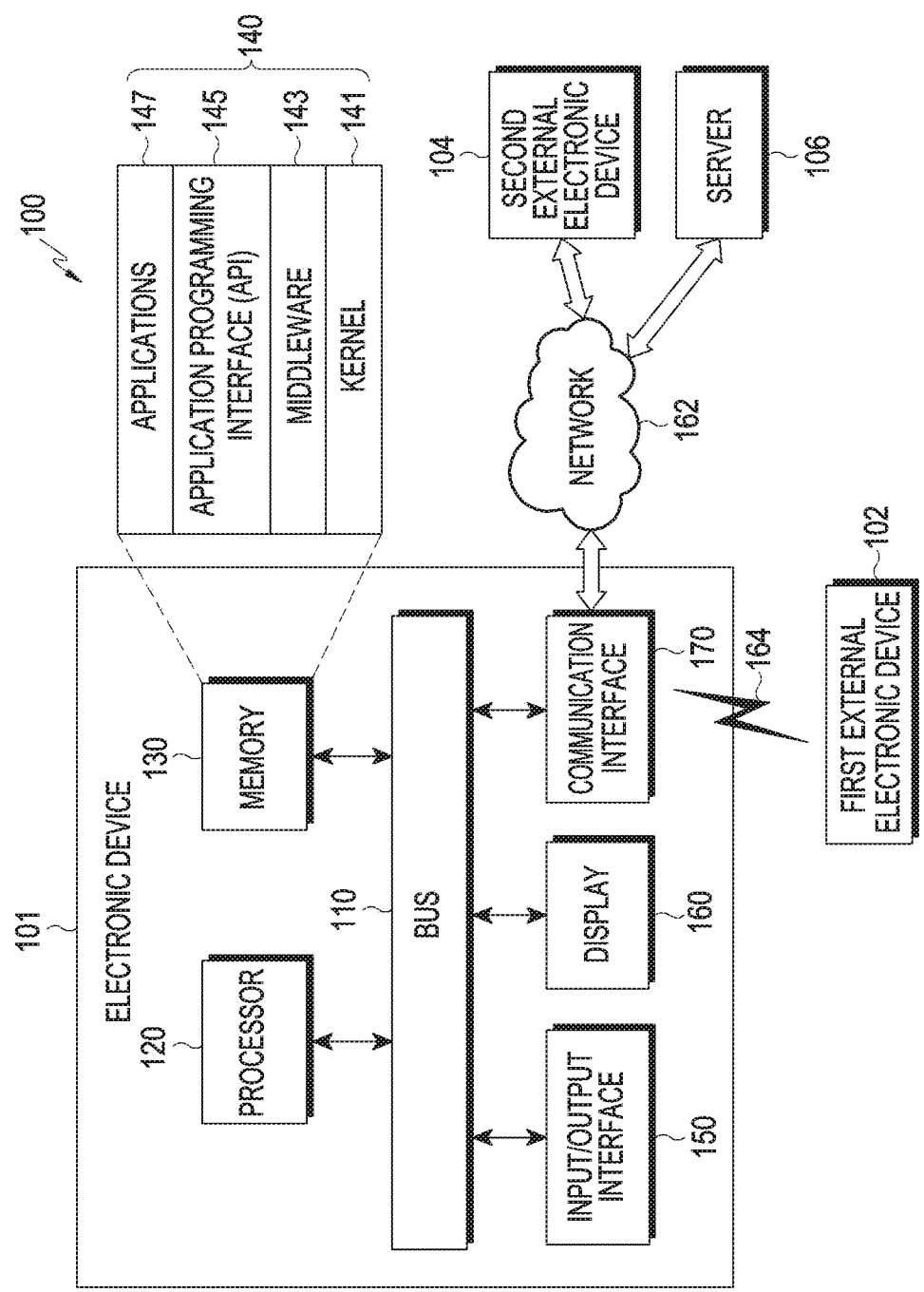
FIG. 1 illustrates an electronic device within a network environment according to various embodiments.

Hereinafter, various embodiments will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various elements regardless of the order and/or the importance, and is used merely to distinguish one element from another element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments may be interchangeably used with, for example, "suitable for", "having the capacity to", "adapted to", "made to", "capable of", or "designed to" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, or a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio device, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. According to an embodiment, the electronic devices are not limited to those described above. In the disclosure, the term "user" may indicate a person using an electronic device or a device (e.g., an artificial intelligence electronic device) using an electronic device.

Referring to FIG. 1, an electronic device 101 within a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the elements, or may further include another element. The bus 110 may include, for example, a circuit that interconnects the elements 110 to 170 and transmits communication (for example, control messages or data) between the elements. The processor 120 may include one or more of a central processing unit, an application processor, and a communication processor (CP). The processor 120 may carry out, for example, operations or data processing related to the control and/or communication of at least one other element of the electronic device 101.

The memory 130 may include volatile and/or non-volatile memory. The memory 130 may store, for example, commands or data related to at least one other element of the electronic device 101. According to an embodiment, the memory 130 may store software and/or a program 140. The program 140 may include, for example, a kernel 141, middleware 143, an application programming interface (API) 145, and/or applications (or "apps") 147. At least some of the kernel 141, the middleware 143, and the API 145 may be referred to as an operating system. The kernel 141 may control or manage system resources (for example, the bus 110, the processor 120, or the memory 130) used for executing an operation or function implemented by other programs (for example, the middleware 143, the API 145, or the applications 147). Furthermore, the kernel 141 may provide an interface through which the middleware 143, the API 145, or the applications 147 can access the individual elements of the electronic device 101 to control or manage the system resources.

The middleware 143 may function as, for example, an intermediary for allowing the API 145 or the applications 147 to communicate with the kernel 141 to exchange data. Furthermore, the middleware 143 may process one or more task requests, which are received from the applications 147, according to priorities thereof. For example, the middleware 143 may assign priorities for using the system resources (for example, the bus 110, the processor 120, the memory 130, or the like) of the electronic device 101 to one or more of the applications 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward commands or data, input from a user or an external device, to the other element(s) of the electronic device 101, or may output instructions or data, received from the other element(s) of the electronic device 101, to the user or an external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of contents (e.g., text, images, videos, icons, or symbols) to the user. The display 160 may include a touch screen and may receive, for example, a touch, gesture, proximity, or hovering input using an electronic pen or the user's body part. The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, a cellular communication that uses at least one of LTE, LTE-Advance (LTE-A), Code Division Multiple Access (CDMA), Wideband CDMA (WCDMA), Universal Mobile Telecommunications System (UMTS), Wireless Broadband (WiBro), Global System for Nobile communications (GSM), or the like. According to an embodiment, as indicated by reference numeral 164 in FIG. 1, the wireless communication may include at least one of wireless fidelity (WiFi), light fidelity (LiFi), Bluetooth, Bluetooth Low Energy (BLE), Zigbee, Near Field Communication (NFC), magnetic secure transmission, Radio Frequency (RF), or Body Area Network (BAN). According to an embodiment, the wireless communication may include a Global Navigation Satellite System (GNSS). The GNSS may be, for example, a Global Positioning System (GPS), a Global Navigation Satellite System (GLONASS), a BeiDou navigation satellite system (hereinafter, referred to as "BeiDou"), or Galileo (the European global satellite-based navigation system). Hereinafter, in this disclosure, the term "GPS" may be interchangeable with the term "GNSS". The wired communication may include, for example, at least one of a Universal Serial Bus (USB), a High Definition Multimedia Interface (HDMI), Recommended Standard 232 (RS-232), power line communication, or a Plain Old Telephone Service (POTS). The network 162 may include a telecommunications network, for example, at least one of a computer network (for example, a LAN or a WAN), the Internet, and a telephone network.

Each of the first and second external electronic devices 102 and 104 may be of the same or a different type from the electronic device 101. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result thereof to the electronic device 101. The electronic device 101 may provide the received result as it is, or may additionally process the received result to provide the requested functions or services. To this end, for example, cloud computing, distributed computing, or client-server computing technology may be used.

Figure 2:
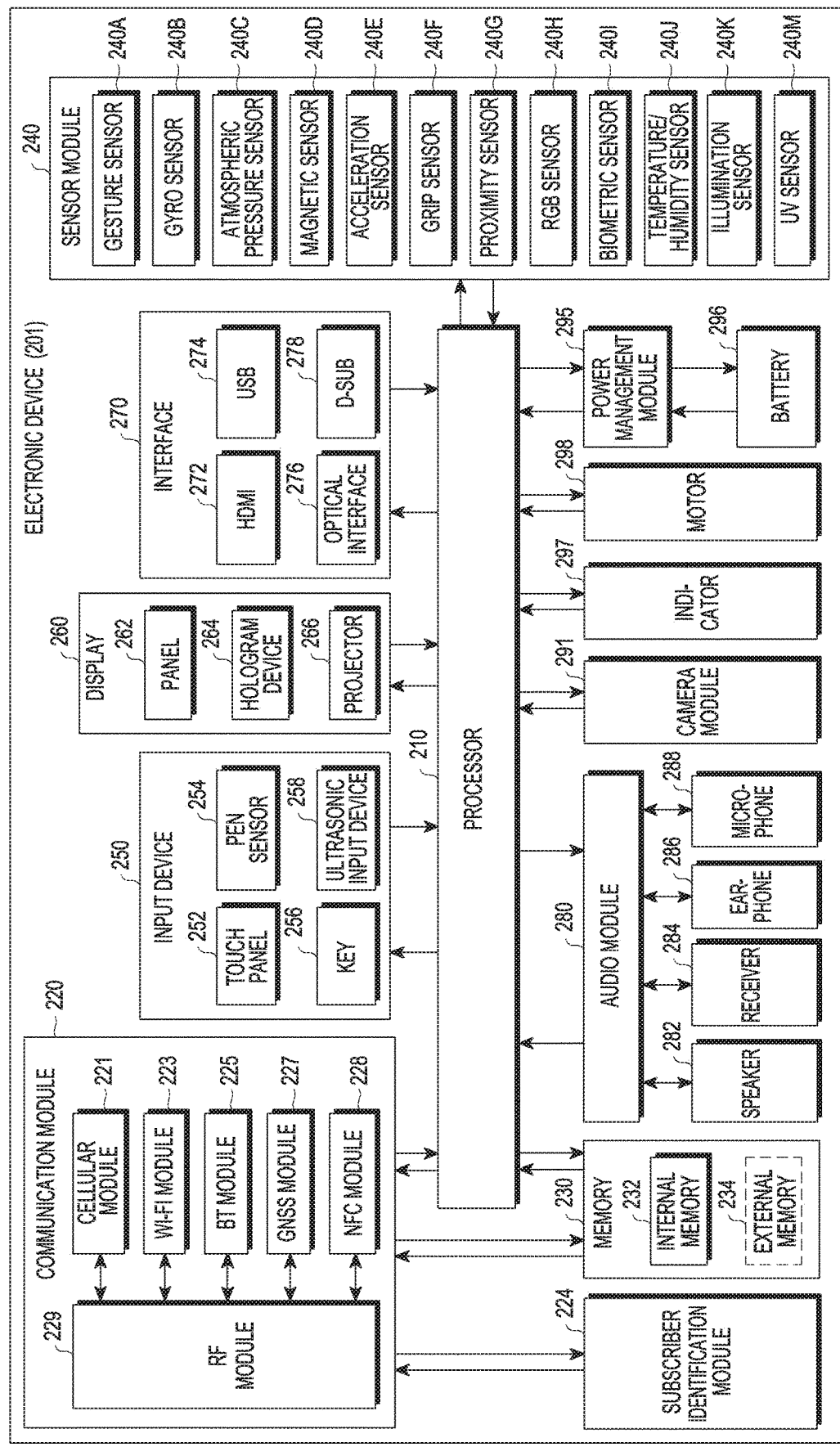
FIG. 2 is a block diagram of the electronic device according to various embodiments.

FIG. 2 is a block diagram illustrating an electronic device 201 according to various embodiments.

The electronic device 201 may include, for example, the whole or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application program. The processor 210 may be implemented by, for example, a System on Chip (SoC). According to an embodiment, the processor 210 may further include a Graphic Processing Unit (GPU) and/or an image signal processor. The processor 210 may also include at least some of the elements illustrated in FIG. 2 (for example, a cellular module 221). The processor 210 may load, in volatile memory, instructions or data received from at least one of the other elements (for example, non-volatile memory), process the loaded instructions or data, and store the resultant data in the non-volatile memory.

The communication module 220 may have a configuration that is the same as, or similar to, that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice communication service, a video communication service, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 can provide. According to an embodiment, the cellular module 221 may include a Communication Processor (CP). In some embodiments, at least some (two or more) of the cellular module 221, the Wi-Fi module 223, the Bluetooth module 225, the GNSS module 227, or the NFC module 228 may be included in a single Integrated Chip (IC) or IC package. The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), an antenna, or the like. According to another embodiment, at least one of the cellular module 221, the Wi-Fi module 223, the Bluetooth module 225, the GNSS module 227, and the NFC module 228 may transmit/receive an RF signal through a separate RF module. The subscriber identification module 224 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, or the like) and a non-volatile memory (for example, a One Time Programmable ROM (OTPROM), a PROM, an EPROM, an EEPROM, a mask ROM, a flash ROM, a flash memory, a hard disc drive, or a Solid State Drive (SSD)). The external memory 234 may include a flash drive, for example, a Compact Flash (CF), a Secure Digital (SD), a micro-SD, a mini-SD, an eXtreme digital (xD), a Multi-Media Card (MMC), or a memory stick. The external memory 234 may be functionally and/or physically connected to the electronic device 201 through various interfaces.

The sensor module 240 may, for example, measure a physical quantity or detect the operating state of the electronic device 201 and convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may employ, for example, at least one of a capacitive scheme, a resistive scheme, an infrared scheme, and an ultrasonic scheme. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure a strength of pressure of a user's touch. The pressure sensor may be implemented integrally with the touch panel 252 or as one or more sensors separate from the touch panel 252. The hologram device 264 may show a three-dimensional image in the air by using an interference of light. The projector 266 may display an image by projecting light onto a screen. The screen may be located, for example, at the inside or outside of the electronic device 201. The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may, for example, include a Mobile High-Definition link (MHL) interface, a Secure Digital (SD) card/Multi-Media Card (MMC) interface, or an Infrared Data Association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, an earphone 286, the microphone 288, and the like. The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device that can process media data according to a standard, such as Digital Multimedia Broadcasting (DMB), Digital Video Broadcasting (DVB), mediaFlo™, and the like. Each of the above-described component elements of hardware according to the disclosure may include one or more elements, and the names of the corresponding elements may change on the basis of the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

Figure 3:
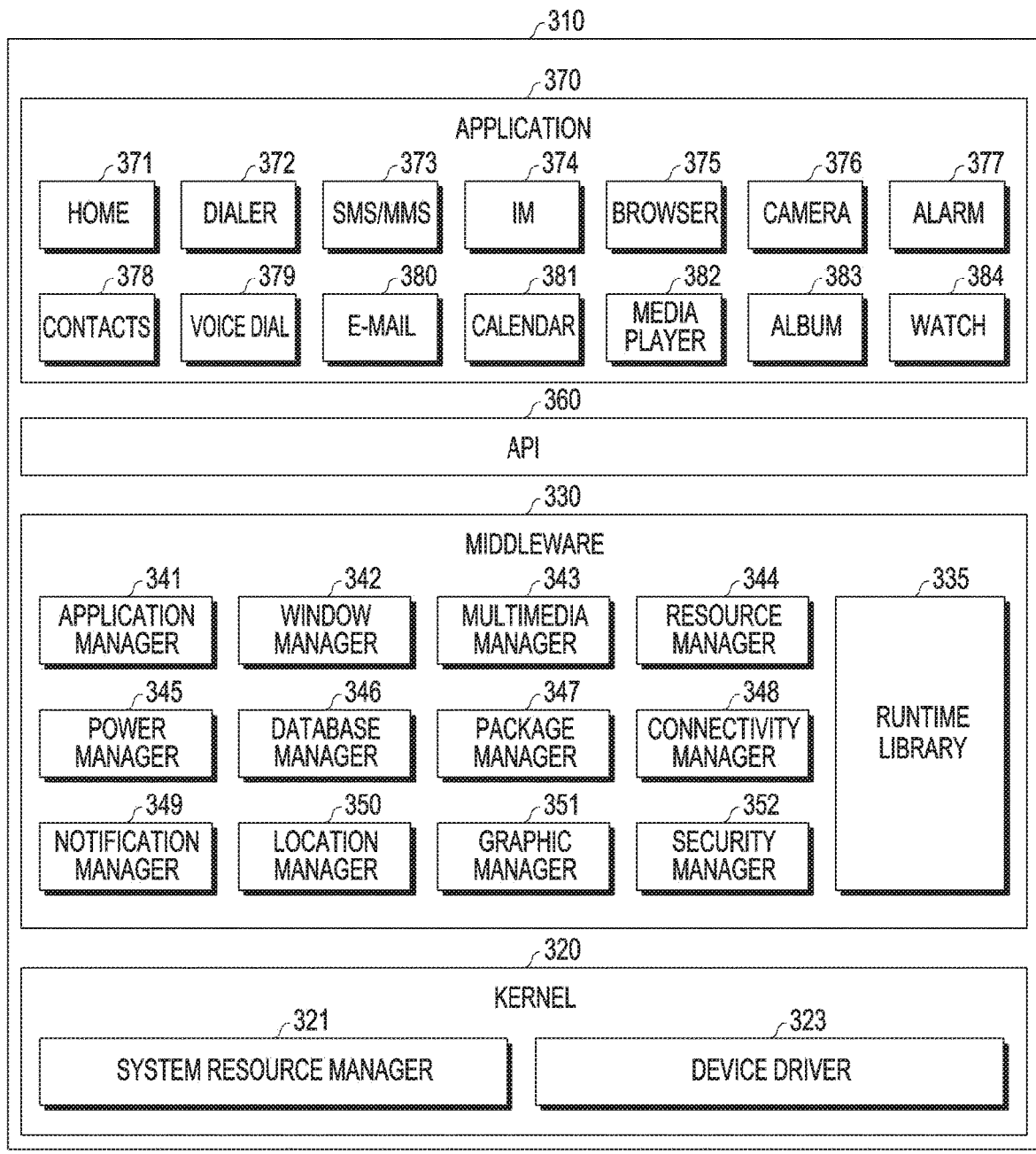
FIG. 3 is a block diagram of a program module according to various embodiments.

FIG. 3 is a block diagram of a program module according to various embodiments.

According to an embodiment, the program module 310 (for example, the program 140) may include an Operating System (OS) that controls resources relating to an electronic device (for example, the electronic device 101) or various applications (for example, the applications 147) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the application 370 is being executed. The runtime library 335 may perform an input/output, manage a memory, or process an arithmetic function. The application manager 341 may manage, for example, the life cycle of the application 370. The window manager 342 may manage GUI resources used for a screen. The multimedia manager 343 may identify formats required for reproducing various media files and may encode or decode a media file using a codec suitable for the corresponding format. The resource manager 344 may manage the source code of the application 370 or the space in memory. The power manager 345 may manage, for example, battery capacity, temperature, or power, and may determine or provide power information required for the operation of the electronic device on the basis of corresponding information. According to an embodiment, the power manager 345 may operate in conjunction with a Basic Input/Output System (BIOS). The database manager 346 may, for example, generate, search, or change databases to be used by the application 370. The package manager 347 may manage the installation or update of an application that is distributed in the form of a package file.

The connectivity manager 348 may manage, for example, a wireless connection. The notification manager 349 may provide information on an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operation systems. Furthermore, the middleware 330 may dynamically remove some of the existing elements, or may add new elements. The API 360 is, for example, a set of API programming functions, and may be provided while having different configurations depending on the operating system. For example, in the case of Android or iOS, one API set may be provided for each platform, and in the case of Tizen, two or more API sets may be provided for each platform.

The applications 370 may include, for example, a home application 371, a dialer application 372, an SMS/MMS application 373, an instant messaging (IM) application 374, a browser application 375, a camera application 376, an alarm application 377, a contact application 378, a voice dial application 379, an email application 380, a calendar application 381, a media player application 382, an album application 383, a watch application 384, a health-care application (for example, for measuring exercise quantity or blood glucose), or an application providing environmental information (for example, atmospheric pressure, humidity, or temperature information). According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may perform a function (for example, a function of turning on/off an external electronic device (or some elements thereof) or controlling brightness (or resolution) of the display) of the external electronic device communicating with the electronic device or install, delete, or update an application executed by the external electronic device. According to an embodiment, the applications 370 may include applications (for example, a health care application of a mobile medical appliance) that are designated according to the attributes of an external electronic device. According to an embodiment, the application 370 may include applications received from an external electronic device. At least some of the program module 310 may be implemented (for example, executed) by software, firmware, hardware (for example, the processor 210), or a combination of two or more thereof and may include a module, a program, a routine, an instruction set, or a process for performing one or more functions.

Figure 4:
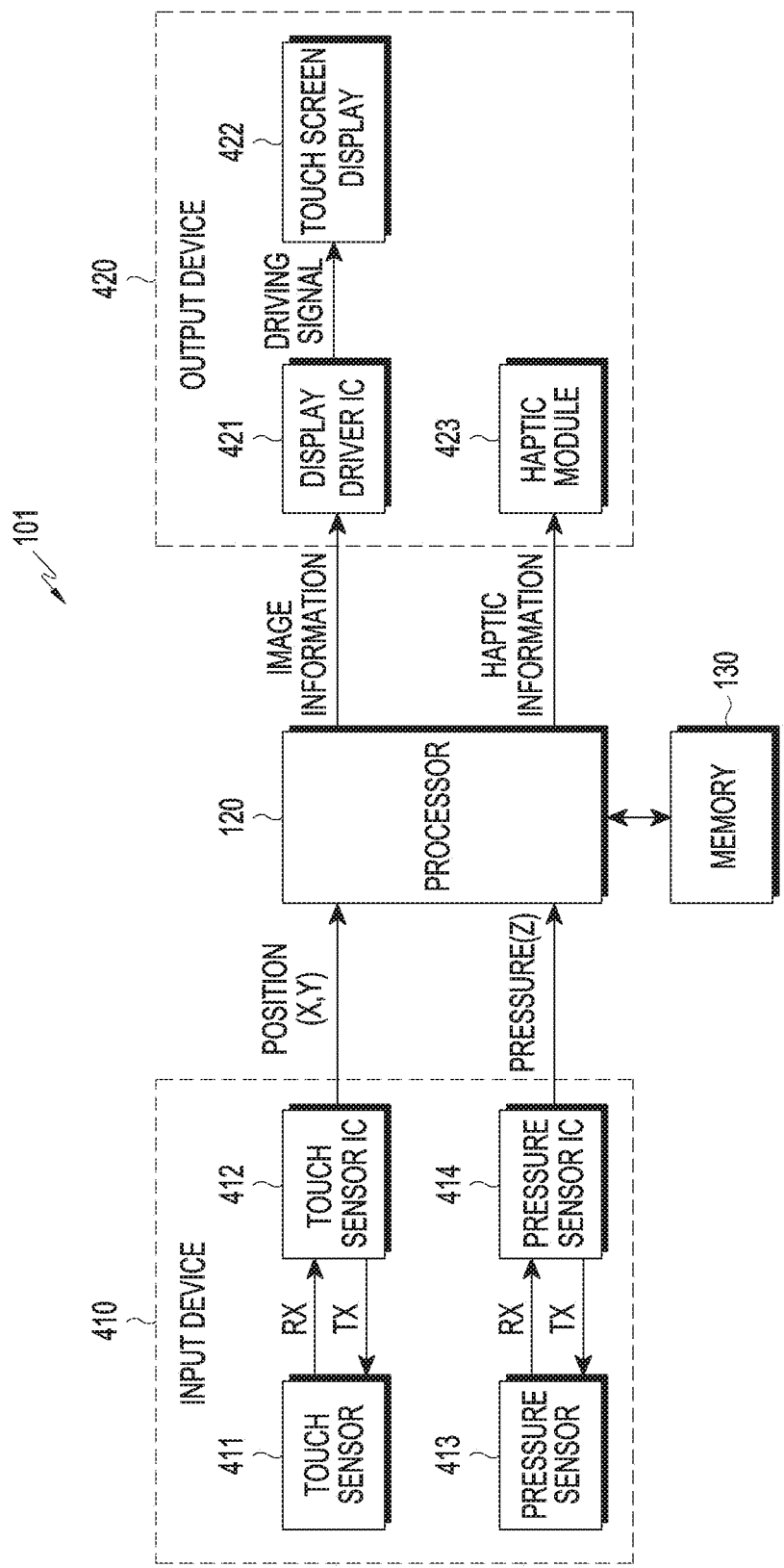
FIG. 4 illustrates an example of a configuration of the electronic device according to various embodiments.

FIG. 4 illustrates an example of a configuration of an electronic device according to various embodiments.

Referring to FIG. 4, according to various embodiments, the electronic device 101 may include the processor 120, an input device 410, the memory 130, and an output device 420. The electronic device 101 may further include a communication module (not shown).

According to various embodiments, the output device 420 of the electronic device 101 may include a touch screen display 422, a display driver IC 421, and a haptic module 423, and the input device 410 may include a touch sensor 411, a touch sensor IC 412, a pressure sensor 413, and a pressure sensor IC 414. A description of an element in FIG. 4 which overlaps the element described with reference to FIGS. 1 to 3 may be omitted.

According to various embodiments, the touch screen display 422 may receive an image driving signal from the touch screen display driver 421. The touch screen display 422 may display various pieces of content and/or items (for example, text, images (objects), videos, icons, function objects, or symbols) on the basis of the image driving signal. In the disclosure, the touch screen display 422 may be overlappingly coupled with the touch sensor 411 and/or the pressure sensor 413 (for example, see FIG. 2) and may be referred to simply as a "display panel". The touch screen display 422 may be driven with a low power mode.

According to various embodiments, the display driver IC 421 may supply an image driving signal corresponding to image information received from the processor 120 to the touch screen display 422 at a preset frame rate. The display driver IC 421 may drive the touch screen display 422 in a low power mode. Although not illustrated, according to an embodiment, the display driving IC 421 may include a graphic RAM, an interface module, an image-processing unit, a multiplexer, a display timing controller (T-con), a source driver, a gate driver, and/or an oscillator.

According to various embodiments, a predetermined physical quantity (for example, voltage, light amount, resistance, or capacitance) of the touch sensor 411 may be changed by a user's touch. According to an embodiment, the touch sensor 411 may overlap the touch screen display 422.

According to various embodiments, the touch sensor IC 412 may detect a change in a physical quantity of the touch sensor 411 and obtain the location (for example, X and Y coordinates) at which the touch is made on the basis of a change in the physical quantity (for example, voltage, resistance, or capacitance). The obtained location (for example, X and Y coordinates) may be provided (or reported) to the processor 120. For example, when a user's body part (for example, a finger) or an electronic pen comes into contact with a cover glass of the touch screen display (for example, a cover glass 501 of FIG. 5 and a cover glass 601 of FIG. 6), a coupling voltage between a transmitting side (Tx) and/or a receiving side (Rx) included in the touch sensor 411 may be changed. In another example, when a user's body part (for example, finger) or an electronic pen does not come into contact with the cover glass (for example, a cover glass 501 of FIG. 5 and a cover glass 601 of FIG. 6) of the touch screen display (for example, a proximity touch or hovering), a coupling voltage between a transmitting side (Tx) and/or a receiving side (Rx) included in the touch sensor 411 may be changed. For example, the change in the coupling voltage may be detected by the touch sensor IC 412, and the touch sensor IC 412 may transfer the touch location (for example, X and Y coordinates) to the processor 120. The processor 120 may acquire data related to the location (for example, X and Y coordinates) as an event of user input.

According to various embodiments, the touch sensor IC 412 may be referred to as a touch IC, a touch screen IC, a touch controller, or a touch screen controller IC. According to an embodiment, in the electronic device, which does not include the touch sensor IC 412, the processor 120 may perform the function of the touch sensor IC 412. According to an embodiment, the touch sensor IC 412 and the processor 120 may be implemented as a single element (for example, one chip).

According to various embodiments, the pressure sensor 413 may detect pressure (or force) by an external object (for example, a finger or an electronic pen). According to an embodiment, a physical quantity (for example, capacitance) of the pressure sensor 413 between a transmitting side (Tx) and a receiving side (Rx) may be changed by a touch. The pressure sensor 413 may be disposed between a first plate and a second plate of the electronic device 101 and may include a pressure detection circuit configured to detect pressure by external pressure applied to at least a portion of the display 160.

According to various embodiments, the pressure sensor IC 414 may detect a change in the physical quantity (for example, capacitance) of the pressure sensor 413 and calculate pressure (Z) applied by a user's touch on the basis of the change in the physical quantity. The pressure sensor IC 414 may obtain a change (speed) in pressure intensity made for a unit time and a direction in which pressure is applied. The pressure sensor IC 414 may provide pressure (Z), the intensity, speed, and direction of the pressure, and the touch location (X and Y) to the processor 120.

According to various embodiments, the pressure sensor IC 414 may be referred to as a force touch controller, a force sensor IC, or a pressure panel IC. Further, according to various embodiments, the pressure sensor IC 414 may be implemented together with the touch sensor IC 412 as a single element (for example, one chip).

According to various embodiments, the haptic module 423 (for example, a haptic actuator) may provide haptic feedback (for example, vibration) to the user according to a control command of the processor 120. In another example, in order to provide faster feedback, the haptic module 423 (for example, the haptic actuator) may receive a direct touch or a pressure event from the touch sensor IC 412 or the pressure sensor IC 414 without any intervention of the processor 120 and provide haptic feedback (vibration) to the user. For example, the haptic module 423 may provide haptic feedback to the user when a touch input (for example, including a touch and a hovering force touch) is received from the user.

According to various embodiments, the memory 130 may store a command or data associated with an operation of an element included in the electronic device 110. For example, the memory 130 may store at least one application including a user interface configured to display a plurality of items on the touch screen display. For example, the memory 130 may store instructions to cause the processor 120 to perform various operations described in this document when executed.

According to various embodiments, the processor 120 may be electrically connected to, for example, the elements 411 to 414 and 421 to 423 included in the electronic device 101 and perform calculations or data processing associated with control and/or communication of the elements 411 to 414 and 421 to 423 included in the electronic device 101. For example, the processor 120 may synchronize the touch location (for example, X and Y coordinates) acquired from the touch sensor IC 412 and the touch pressure (intensity) acquired from the pressure sensor IC 414. When the touch pressure (intensity) acquired from the pressure sensor IC 414 is larger than or equal to a predetermined pressure (intensity), the processor 120 may transmit information for displaying an image effect corresponding to the predetermined pressure (intensity) to the display driver IC 421. When the touch pressure (intensity) acquired from the pressure sensor IC 414 is larger than or equal to the predetermined pressure (intensity), the processor 120 may transmit information for generating a haptic effect corresponding to the predetermined pressure (intensity) to the haptic module 423.

According to various embodiments, the processor 120 may launch (or execute) an application (or simply referred to as an "app") for displaying a user interface on the touch screen display 422. The processor 120 may display the array of a plurality of items in the user interface displayed on the touch screen display 422 in response to the launching of the application.

According to various embodiments, the processor 120 may receive first data generated by the touch sensor 411 and receive second data (data including pressure (Z) of the touch) generated by the pressure sensor 413.

According to various embodiments, the processor 120 may activate at least a portion of the pressure sensor 413 while the touch screen display 422 is turned off. Alternatively, the processor 120 may at least partially activate the pressure sensor 413 while the touch screen display 422 is turned off. For example, the processor 120 may activate an entirety or part of the pressure sensor 413 even in a case where the element such as the touch screen display 422 is turned off and is in an idle state as well as in a case where the electronic device 101 is in an awake state. Meanwhile, the processor 120 may at least partially deactivate the touch sensor 411 while the touch screen display 422 is turned off or the electronic device 101 is in the idle state. Alternatively, the processor 120 may at least partially deactivate the touch sensor 411 in order to reduce power consumption in the idle state and prevent a malfunction by a touch.

According to various embodiments, when a predetermined condition is satisfied while the touch screen display 422 is turned off, the processor 120 may activate at least a portion of the pressure sensor 413. For example, the processor 120 may acquire the pressure sensor 413 after a predetermined time from the turning-off of the touch screen display 422 or until a predetermined time. In another example, when the use of the electronic device by the user is detected by a gyro sensor or a proximity sensor, the processor 120 may activate the pressure sensor 413. In yet another example, when a temperature is lower than a predetermined value for a predetermined time interval, when a touch is detected through a touch panel, when the electronic device 101 approaches another external device, or when a stylus pen within the electronic device 101 is withdrawn from the electronic device 101, the processor 120 may active the pressure sensor 413. In still another example, the processor 120 may acquire the pressure sensor 413 while an application (for example, a music player) operating in the idle state is executed.

According to various embodiments, when the predetermined condition is satisfied while the touch screen display 422 is turned off, the processor 120 may deactivate at least a portion of the pressure sensor 413. For example, when it is detected that the electronic device 101 is put into a pocket or a bag, or that the electronic device 101 is upside down, through a proximity sensor, an illumination sensor, an acceleration sensor, and/or a gyro sensor, the processor 120 may deactivate the pressure sensor 413. In another example, when the electronic device 101 is connected to an external device (for example, is connected to a desktop), the processor 120 may deactivate the pressure sensor 413.

According to various embodiments, the processor 120 may activate only a predetermined area of the pressure sensor 413 while the touch screen display 422 is turned off. For example, the processor 120 may activate a predetermined area of the pressure sensor 413 (for example, a central lower area of the pressure sensor 413) in order to reduce power consumption in the idle state. Alternatively, when the pressure sensor 413 is implemented as a set of two or more sensors, the processor 120 may activate some of the two or more sensors.

According to various embodiments, the processor 120 may detect pressure through the pressure sensor 413 while the electronic device 101 is in the idle state by activating or enabling the pressure sensor 413. For example, the processor 120 may receive data related to pressure by an external object on the touch screen display 422 from the pressure sensor 413 while the touch screen display 422 is turned off.

According to various embodiments, the processor 120 may determine whether the pressure is larger than or equal to a selected level on the basis of data related to the pressure and, when it is determined that the pressure is larger than or equal to the selected level, perform a function without fully turning on the touch screen display 422. For example, the processor 120 may perform the function when pressure greater than a predetermined level is detected. In this case, the processor 120 may turn on a portion of the touch screen display 422. The processor 120 may determine the following functions to be performed on the basis of at least one of a position at which the pressure is detected, an intensity, the number of points, a speed, a direction, and a duration time. For example, when pressure is detected at a location corresponding to a central lower part of the touch screen display 422, the processor 120 may wake up the electronic device 101. When pressure is detected at a location corresponding to an upper left part, the processor 120 may control a volume of a speaker of the electronic device 101. When pressure is detected at a location adjacent to hardware such as an earjack or a USB port, the processor 120 may perform a function related to the adjacent hardware. When pressure greater than or equal to a predetermined intensity is detected, the processor 120 may control the electronic device 101 to enter an emergency mode. The processor 120 may perform different functions depending on the number of points at which pressure is simultaneously detected.

Although FIG. 4 illustrates that the pressure sensor 413 provides data on the pressure (Z) to the processor 120, the disclosure is not limited thereto, and when the pressure sensor 413 is implemented as a set of two or more sensors, the processor 120 may detect a location to which pressure is applied on the basis of the sensor of which capacitance is changed among the two or more sensors. For example, when the pressure sensor 413 is implemented as a set of six sensors arranged in a 3×2 array, the processor 120 may determine a location to which pressure is applied on the basis of a change in capacitance of each of the six sensors and the location of each of the six sensors. That is, the processor 120 may determine the position to which the pressure is applied without using the touch sensor 411. When the pressure is detected by the pressure sensor 413, the processor 120 may activate the touch sensor 411 and detect the position at which the pressure is applied through the touch sensor 411.

According to various embodiments, when pressure of a first level by a touch is detected by the pressure sensor 413, the processor 120 may perform a first function. The processor 120 may determine the first function on the basis of at least one of a position at which the pressure of the first level is detected, an intensity, the number of points, a speed, a direction, and a duration time and may perform the determined first function. The pressure of the first level may refer to pressure having an intensity within a predetermined range.

According to various embodiments, when pressure of a second level by a touch is detected by the pressure sensor 412 while the first function is performed, the processor 120 may perform a second function associated with the first function. The processor 120 may determine the second function on the basis of at least one of a position at which the pressure of the second level is detected, an intensity, the number of points, a speed, a direction, and a duration time. The pressure of the second level may refer to pressure having an intensity in a predetermined range. The intensity of the pressure of the second level may be larger than or smaller than the intensity of the pressure of the first level. Further, the intensity of the pressure of the second level and the intensity of the pressure of the first level may be the same as each other. When pressure is detected while the first function is performed, the processor 120 may perform the second function related to the first function being performed so as to execute various functions by pressure, corresponding to a one-dimensional input. Further, according to the size of pressure applied to the electronic device 101 after one touch is made on the electronic device 101, a different function related to the performed function may be executed, which increases the convenience of input.

According to various embodiments, the electronic device 101 may use a value measured by at least one sensor (for example, an acceleration sensor and a gyro sensor) to distinguish between a long press input and a pressure input. Further, the electronic device 101 may use a fingerprint, a camera, and an iris to distinguish between a long press input and a pressure input.

The above-described operation of the processor 120 is merely an example, and the disclosure is not limited thereto. For example, it may be understood that the operation of the processor described in other parts of the present document is the operation of the processor 460. Further, in this document, it may be understood that at least some of the operations described as the operations of the "electronic device" are the operations of the processor 120.

According to various embodiments, the electronic device 101 (for example, the processor 120) may include a housing including a first plate and a second plate separated from the first plate, the touch screen display 160 disposed within the housing and exposed through a portion of the first plate, the pressure detection circuit 413 disposed between the first plate and the second plate and configured to detect pressure by external pressure applied to at least a portion of the touch screen display, a wireless communication circuit 960 disposed within the housing, at least one processor 120 disposed within the housing and electrically connected to the touch screen display 160, the pressure detection circuit 413, and the wireless communication circuit, and the memory 130 disposed within the housing and electrically connected to the processor 120, wherein the memory 130 may be configured to store an application comprising a user interface and instructions, wherein the instructions are configured to cause the processor to, when executed, display at least one object in the user interface on the touch screen display, detect a pressure level of a user input on or around the at least one object through the pressure detection circuit, and select one of a plurality of operations related to the at least one object, based on at least a portion of the detected pressure level.

According to an embodiment, the electronic device 101 (for example, the processor 120) may display a plurality of adjacent objects on the touch screen display and select one or more objects on the basis a position of the user input and at least a portion of the detected pressure level.

According to an embodiment, the electronic device 101 (for example, the processor 120) may determine a plurality of objects corresponding to the detected pressure level and select one of the determined plurality of objects.

According to an embodiment, the electronic device 101 (for example, the processor 120) may select an object having deep depth information from the determined plurality of objects in proportion to a size of the detected pressure level.

According to an embodiment, the electronic device 101 (for example, the processor 120) may perform pairing of the determined plurality of objects.

According to an embodiment, the electronic device 101 (for example, the processor 120) may perform pairing of the selected object and the electronic device.

According to an embodiment, the electronic device 101 (for example, the processor 120) may determine attributes of at least one of the selected object or objects which are not selected among the determined plurality of objects.

According to an embodiment, the electronic device 101 (for example, the processor 120) may change and display the image, based on the determined attributes.

According to an embodiment, the electronic device 101 (for example, the processor 120) may perform at least one of enlarging a size of the selected object at a predetermined magnitude and displaying the object, changing a color of the selected object and displaying the object, transparently displaying remaining parts except for boundaries of the objects which are not selected, or translucently displaying the objects which are not selected.

According to an embodiment, when a number of user inputs is at least two, the electronic device 101 (for example, the processor 120) may more rapidly select one of the plurality of objects than a case in which the number of user inputs is one.

According to an embodiment, the electronic device 101 (for example, the processor 120) may display a menu including at least one function related to the selected object in accordance with a position at which the selected object is displayed.

According to an embodiment, the electronic device 101 (for example, the processor 120) may display additional information corresponding to the selected object in accordance with a position at which the selected object is displayed.

According to an embodiment, when there is no additional information in the memory, the electronic device 101 (for example, the processor 120) may make a request for additional information corresponding to the selected object to a server and receive the additional information in response to the request.

According to an embodiment, when a request for information for authenticating the electronic device is received from the server, the electronic device 101 (for example, the processor 120) may transmit an identifier of the electronic device to the server in response to the request, and when the authentication is completed, receive the additional information from the server.

Figure 5:
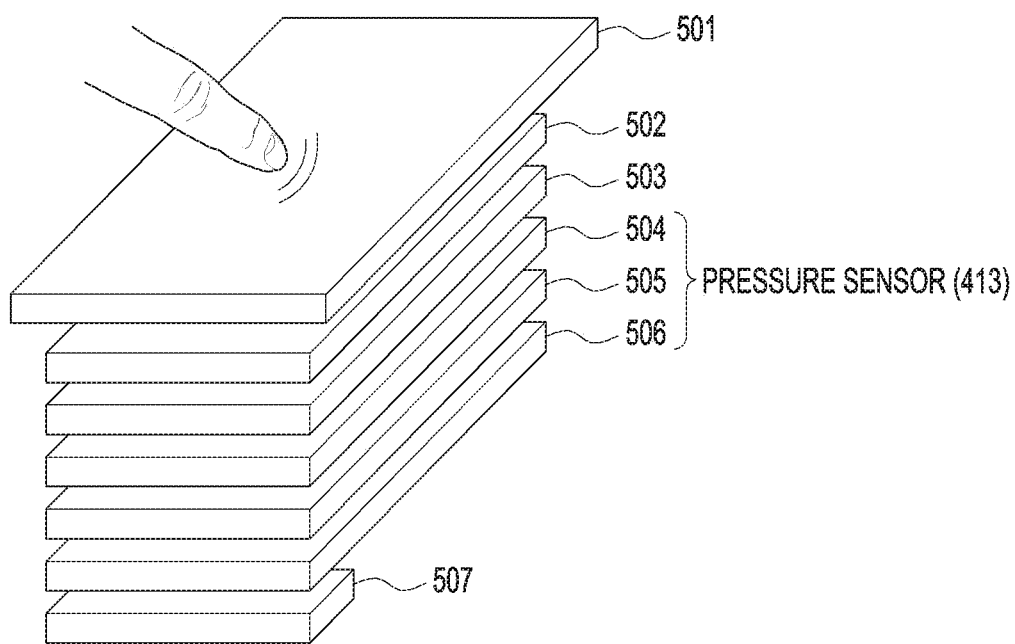
FIGS. 5 and 6 illustrate a structure in which elements included in the electronic device are stacked according to various embodiments.
Figure 6:
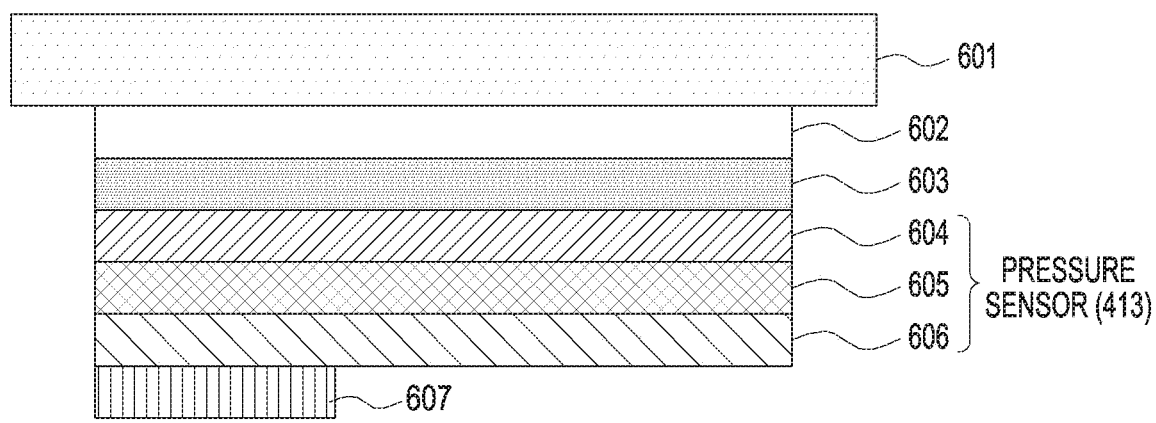

FIGS. 5 and 6 illustrate a structure in which elements included in an electronic device are stacked according to various embodiments.

An electronic device (for example, the electronic device 100 of FIG. 1) may include a housing including a first surface facing a first direction, a second surface facing a direction opposite the first direction, and a side surface surrounding a space between the first surface and the second surface, and a touch screen display between the first surface and the second surface, exposed through the first surface.

The stack structure illustrated in FIGS. 5 and 6 may be applied to the touch screen display 160 illustrated in FIG. 1. Accordingly, the elements illustrated in FIGS. 5 and 6 may be disposed between a front surface (the first surface) and a back surface (the second surface) of the electronic device 101 of FIG. 1.

In the stack structure of the touch screen display according to an embodiment, cover glasses 501 and 601 may transmit light generated by the touch screen display 503. As the user brings his/her body part into contact with the cover glass 501 or 601, a "touch" (including a touch using an electronic pen) may be performed. The cover glass 501 or 601 may be formed with, for example, tempered glass, tempered plastic, or a flexible polymer material, and may protect the touch screen display and the electronic device having the touch screen display from external impact. According to an embodiment, the cover glass 501 or 601 may also be referred to as a glass window or a cover window.

Various physical quantities (for example, voltage, light amount resistance, charge, or capacitance) of the touch sensor 502 or 602 may be changed by contact of an external object (for example, a user's finger or an electronic pen). The touch sensor 502 or 602 may detect at least one location of the touch by the external object on the touch screen display (for example, the surface of the cover glass 501 or 601) on the basis of the change in the physical quantity. For example, the touch sensor 502 or 602 may include a capacitive touch sensor, a resistive touch sensor, an infrared type touch sensor, or a piezo touch sensor. According to an embodiment, the touch sensor 502 or 602 may be referred to as various terms such as a touch panel depending on the implementation form.

The touch screen display 503 or 603 may output at least one piece of content or items (for example, a text, image, video, icon, widget, or symbol). The touch screen display 503 or 603 may include, for example, a liquid crystal touch screen display (LCD) panel, a light-emitting diode (LED) touch screen display panel, an organic light-emitting diode (OLED) touch screen display panel, a microelectromechanical system (MEMS) touch screen display panel, or an electronic paper touch screen display panel.

According to an embodiment, the touch screen display 503 or 603 may be implemented in an integrative form with the touch sensor 502 or 506 (or a touch panel). In this case, the touch screen display 503 or 603 may be referred to as a Touch Screen Panel (TSP) or a touch screen display panel.

The pressure sensor 413 may detect pressure (or force) by an external object (for example, a user's finger or an electronic pen) on the touch screen display (for example, the surface of the cover glass 501 or 601). According to an embodiment, the pressure sensor 413 may include a first electrode 504 or 604, a second electrode 506, 606, and a dielectric layer 505 or 605. For example, the pressure sensor 413 may detect pressure of a touch on the basis of capacitance between the first electrode 504 or 604 and the second electrode 506 or 606 changed by pressure of the touch. Although FIGS. 5 and 6 illustrate that the pressure sensor 413 is implemented in a single sensor, the disclosure is not limited thereto, and the pressure sensor 413 may be implemented as a set of two or more sensors. For example, the pressure sensor 413 may be implemented as a set of six sensors arranged in a 3×2 array.

When a touch (including hovering and/or a "force touch") by an external object (for example, a user's finger or an electronic pen) is received, a haptic module 507 or 607 (for example, a haptic actuator) may provide the user with haptic feedback (for example, vibration). To this end, the haptic module 507 or 607 may include a piezoelectric member and/or a vibration plate.

The stack structure of the touch screen display of FIGS. 5 and 6 is merely an example and may have various modifications. For example, the touch sensor 502 or 602 may be directly formed on the back surface of the cover glass 501 or 601 (that is, touch on cover glass) or may be manufactured separately from the cover glass 501 or 601 and inserted between the cover glass 501 or 601 and the touch screen display 503 or 603 (that is, add-on touch panel), directly formed on the touch screen display 503 or 603 (that is, on-cell touch panel), or included in the touch screen display 503 or 603 (that is, in-cell touch panel). According to various embodiments, the stack structure may further include a transparent or opaque area-type fingerprint sensor.

Figure 7A:
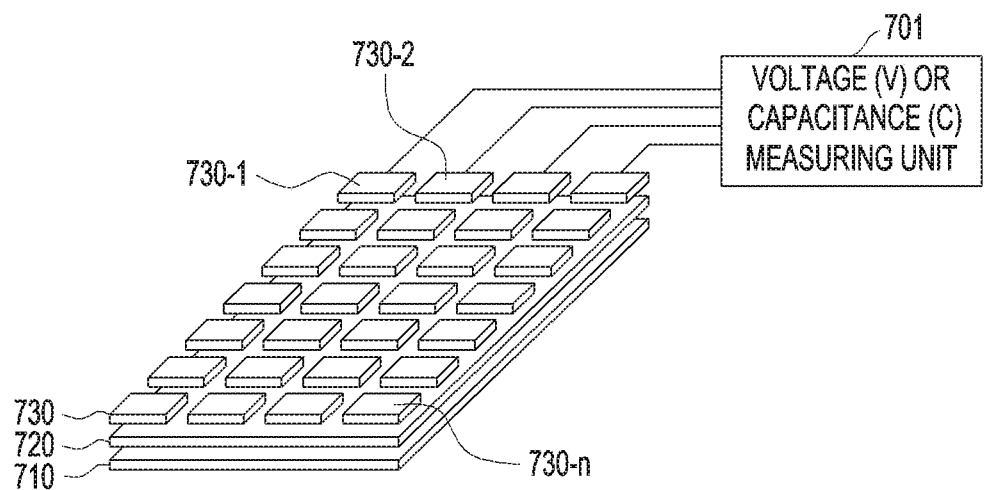
FIG. 7A illustrates an example of a capacitive pressure sensor according to various embodiments.
Figure 7B:
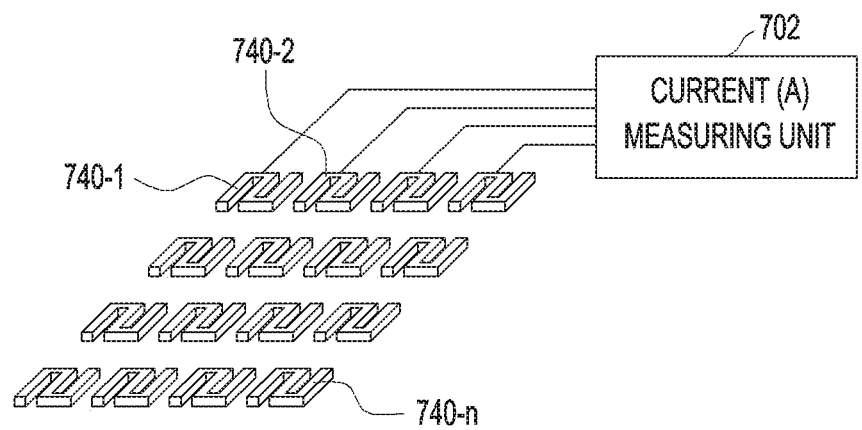
FIG. 7B illustrates an example of a inductive pressure sensor according to various embodiments.
Figure 7C:
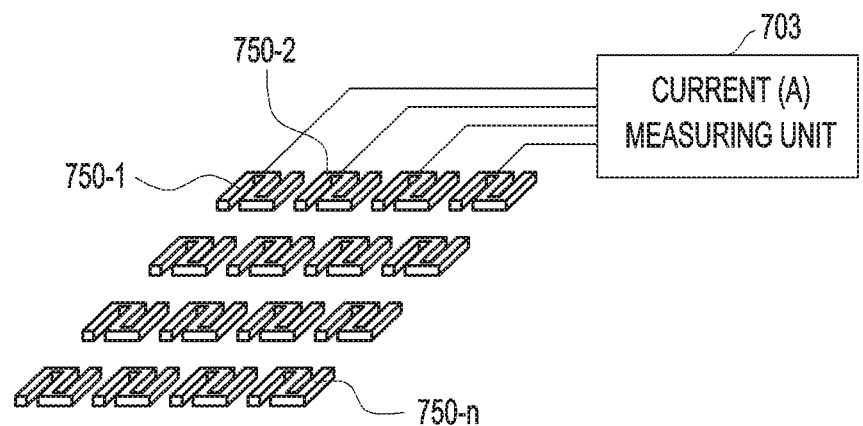
FIG. 7C illustrates an example of a strain-gauge pressure sensor according to various embodiments.
Figure 7D:
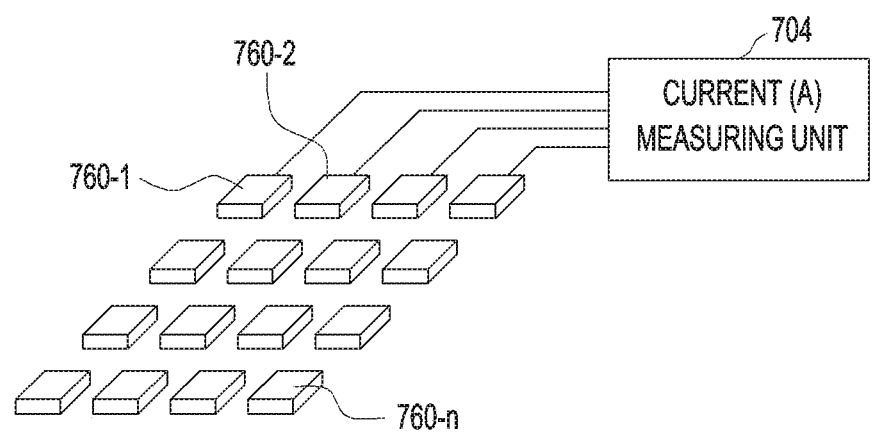
FIG. 7D illustrates an example of a piezo pressure sensor according to various embodiments.

FIG. 7A illustrates an example of a capacitive pressure sensor according to various embodiments, FIG. 7B illustrates an example of an inductive pressure sensor according to various embodiments, FIG. 7C illustrates an example of a strain-gauge pressure sensor according to various embodiments, and FIG. 7D illustrates an example of a piezo pressure sensor.

Referring to FIG. 7A, the capacitive pressure sensor may detect pressure on the basis of a change in capacitance formed between two electrodes according to pressure applied by the user. The capacitance may increase as the distance between the two electrodes is shorter by the pressure applied by the user. The capacitive pressure sensor may include a first electrode layer 730 including a plurality of electrodes (for example, electrodes 730-1, 730-2, ... 730-$n$), a second electrode layer 710 which is one layer extending over an entire area corresponding to the plurality of repetitive electrodes, and a dielectric layer 720 disposed between the first electrode layer and the second electrode layer. Lines 730-1 and 730-1 of the plurality of electrodes (for example, the electrodes 730-1, 730-2, ... 730-$n$) may be connected to a voltage or capacitance measuring unit 701, and the capacitance measuring unit 701 may detect a pressure input of the user and measure the detected value.

Referring to FIG. 7B, the inductive pressure sensor may detect pressure on the basis of a change in a current induced to inductors 740-1, 740-2, ... 740-$n$ (for example, foils) according to the user input. The current may increase as an electric conductor (for example, a metal housing or a user's finger) becomes closer to the inductors (for example, the coils) disposed within the housing by the pressure applied by the user. The inductors may be connected to a current measuring unit 702 and may detect pressure applied by the user and measure the detected value.

Referring to FIG. 7C, the strain-gauge pressure sensor may detect pressure on the basis of a change in resistance of the conductors 750-1, 750-2, ... 750-$n$ according to pressure applied by the user. The resistance may increase as the lengths of the conductors increase and thus cross-sectional areas of the conductors decrease. The conductors may be connected to a current measuring unit 703 and may detect pressure applied by the user and measure the detected value. Wires of the conductors may be configured in a Wheatstone bridge form.

Referring to FIG. 7D, the piezo pressure sensor may detect pressure on the basis of the current generated by piezo materials 760-1, 760-2, ... 760-$n$ according to pressure applied by the user. The current may increase as an amount of current converted by the piezo materials increases by the pressure applied by the user. The piezo materials 760-1, 760-2, ... 760-$n$ may be connected to a current measuring unit 704 and may detect pressure applied by the user and measure the detected value.

Figure 8A:
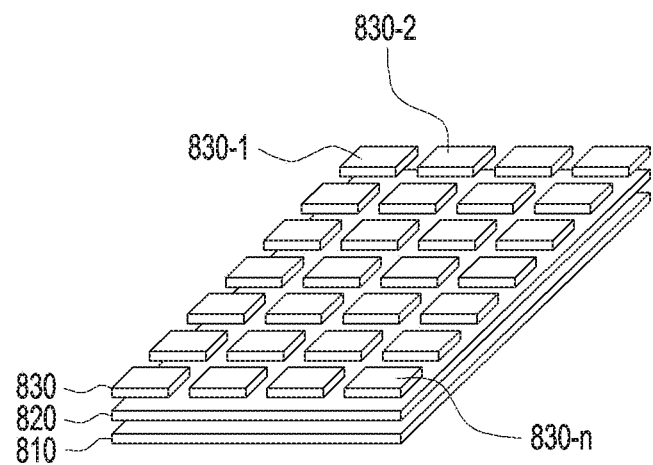
FIG. 8A is a perspective view of a self-capacitive pressure sensor according to various embodiments.
Figure 8B:
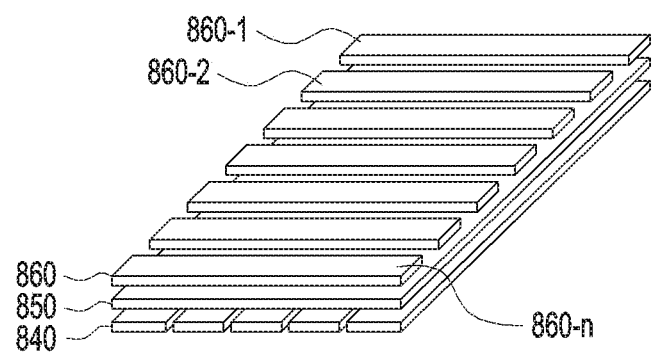
FIG. 8B is a perspective view of a mutual capacitive pressure sensor according to various embodiments.

FIG. 8A is a perspective view of a self-capacitive pressure sensor according to various embodiments, and FIG. 8B is a perspective view of a mutual capacitive pressure sensor according to various embodiments.

Referring to FIG. 8A, the self-capacitive pressure sensor may include a first electrode layer 830 including a plurality of repetitive polygons 830-1, 830-2, ... 830-$n$ (or circles), a second electrode layer 810 which is one layer extending in an entire area corresponding to the plurality of repetitive polygons, and a dielectric layer 820 disposed between the first electrode layer 830 and the second electrode layer 810. The pressure sensor may sense pressure on the basis of a change in capacitance between the first electrode layer and each partial electrode of the first electrode layer 830. Locations or shapes of the first electrode layer 830 and the second electrode layer 810 may be interchangeable.

Referring to FIG. 8B, the mutual capacitive pressure sensor may include a first electrode layer 860 including a plurality of electrodes 860-1, 860-2, ... 860-$n$ extending in a first direction, a second electrode layer 840 including a plurality of electrodes 840-1, 840-2, ... 840-$n$ extending in a first direction actually perpendicular to the first direction, and a dielectric layer 850 disposed between the first electrode layer 860 and the second electrode layer 840. The pressure sensor may sense pressure on the basis of a change in capacitance between the first electrode and the second electrode at a position at which the first electrode layer 860 and the second electrode layer 840 intersect. Locations and shapes of the first electrode and the second electrode may be interchangeable.

According to an embodiment, the first electrode or the second electrode may be opaque or transparent. That is, when the user views the pressure sensor, the user cannot see (opaque) or can see (transparent) an object located opposite the pressure sensor. When the first electrode and the second electrode are opaque, the first electrode or the second electrode may include at least one or a combination of two or more of copper (Cu), silver (Ag), magnesium (Mg), or titanium (Ti). When the first electrode and the second electrode are transparent, the first electrode or the second electrode may include at least one or a combination of two or more of ITO, IZO, a polymer conductive material, graphene, and an opaque wire pattern (Ag nanowire, or metal mesh) having a specific line width or narrower. The dielectric layer may include at least one of silicon, air, foam, membrane, OCA, sponge, rubber, ink, or polymer (PC or PET).

Figure 9:
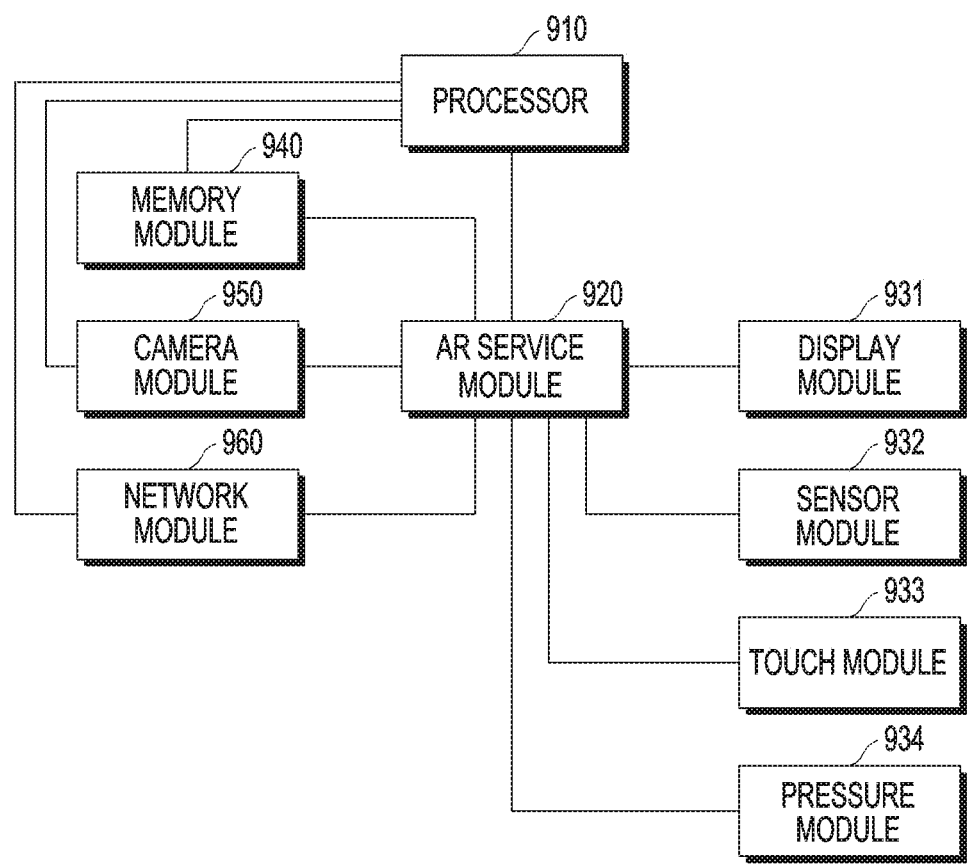
FIG. 9 is a block diagram illustrating the electronic device for detecting a pressure input in an image, in which an object is displayed, and controlling an operation according to various embodiments.

FIG. 9 is a block diagram illustrating an electronic device for detecting a pressure input in an image, in which an object is displayed, and controlling an operation according to various embodiments.

Referring to FIG. 9, the electronic device 10 may include an AR service module 920, a memory module 940, a camera module 950, a network module 960, and a processor 910. The AR service module 920 may perform at least one function or at least one operation performed by the processor 102 (for example, the processor 120 of FIG. 1). The electronic device 10 may include a display module 910, a sensor module 932, a touch module 933, and a pressure module 934. The memory module 940 may perform at least one function or at least one operation performed by a memory (for example, the memory 130 of FIG. 1) and may store data and programs stored in the memory (for example, the memory 130 of FIG. 1). The camera module 950 may perform at least one function or at least one operation performed by a camera module (for example, the camera module 291 of FIG. 2). The network module 960 may perform at least one function or at least one operation performed by a communication interface (for example, the communication interface 170 of FIG. 1). The processor 910 may perform at least one function or at least one operation performed by the processor (for example, the processor 120 of FIG. 1).

According to various embodiments, the AR service module 920 may be electrically connected to the processor 910, the memory module 940, the camera module 950, and the network module 960. At least one of the AR service module 920 or the processor 910 may determine an object selected by the user and perform a function related to the selected object. The AR service module 920 may fundamentally serve to process an image received from the camera module 950 and provide the processed image to the display module 931.

According to an embodiment, the AR service module 920 may receive status information of the electronic device from various sensors included in the electronic device 101, for example, an acceleration sensor, a geomagnetic field sensor, a gravity sensor, an air pressure sensor, an illumination sensor, a temperature sensor, a proximity sensor, and a GPS sensor through the sensor module 932 and may also receive various user touches and pressure input information through the touch module 933 and the pressure module 934 (for example, pressure sensor). The AR service module 920 may determine a virtual viewpoint of the image to be provided to the user on the basis of the input received from the various modules and the image received from the camera module 950.

According to an embodiment, the AR service module 920 may use the memory module 940 and the network module 960 in order to configure the image to be provided to the user in the determined viewpoint. The AR service module 920 may determine image components required for configuring the image, and may access a storage device within the electronic device through the memory module 940 or access a storage device outside the electronic device 101 through the network module 960 in order to acquire the image components.

The AR service module 920 may generate the image to be provided to the user through the determined viewpoint information and the image component acquired to express the determined virtual viewpoint information, recognize an object existing in the generated image, and map additional information, so as to finally complete the image to be provided to the user and transmit the image to the display module 931 to display the image.

Figure 10:
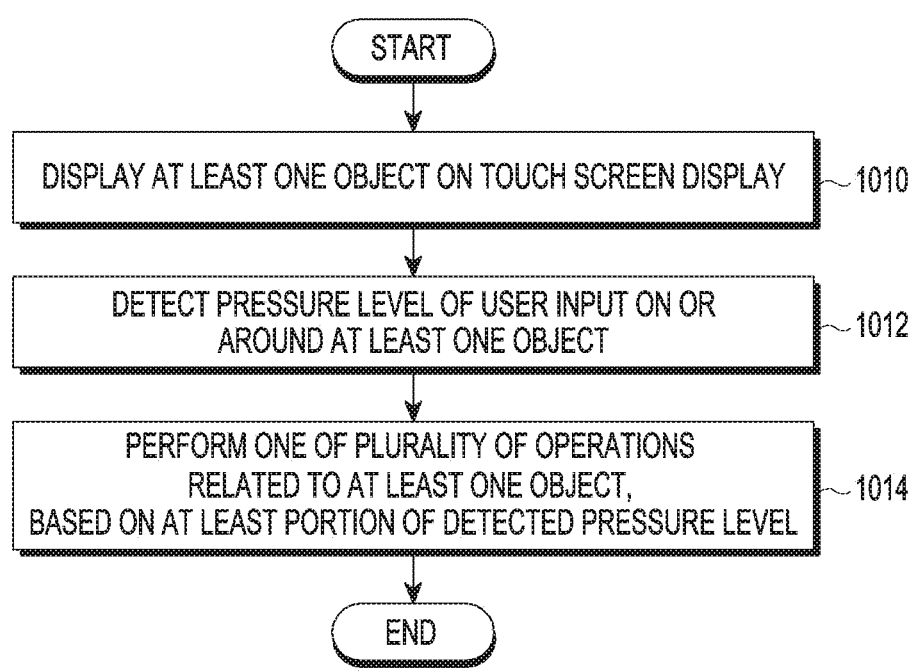
FIG. 10 is a flowchart illustrating a process in which the electronic device controls an operation according to a level of a pressure input according to various embodiments.

FIG. 10 is a flowchart illustrating a process in which an electronic device controls an operation according to a level of a pressure input according to various embodiments.

Hereinafter, the operation of the electronic device according to the level of the pressure input according to various embodiments of the disclosure will be described in more detail with reference to FIG. 10.

According to various embodiments, in operation 1010, the electronic device 101 (for example, the processor 120) may display at least one object on a touch screen display (for example, the touch screen display 930 of FIG. 9). The electronic device 101 may include a housing (not shown) including a first plate and a second plate spaced apart from the first plate, a touch screen display 930 disposed within the housing and exposed through a portion of the first plate, a pressure detection circuit (for example, the pressure sensor 413 of FIG. 4) disposed between the first plate and the second plate and configured to detect pressure by external pressure applied to at least a portion of the touch screen display 930, and a wireless communication circuit (for example, the network module 960 of FIG. 9) disposed within the housing. According to an embodiment, the electronic device 101 (for example, the processor 120) may display a user interface including at least one object capable of performing various operations such as visual feedback and execution of at least one function on the basis of a pressure input of the user on a touch screen display (for example, the touch screen display 930 of FIG. 9). According to an embodiment, the electronic device 101 (for example, the processor 120) may display at least one object in a user interface on the touch screen display (for example, the touch screen display 930 of FIG. 9). The user interface may display at least one 3D object having depth information such as augmented reality and a 3-dimensional (3D) map. The user interface may insert at least one 3D object in a preview image acquired by the camera module (for example, the camera module 950 of FIG. 9) and display the preview image.

According to various embodiments, in operation 1012, the electronic device 101 (for example, the processor 120) may detect a pressure level of a user input on at least one object or around the object. The electronic device 101 (for example, the processor 120) may measure an intensity of a pressure input of the user detected on a plurality of objects displayed to be adjacent to each other on the touch screen display (for example, the touch screen display 930 of FIG. 9) and detect a pressure level of the pressure input. In order to select (or determine) an object selected by the user from the plurality of objects displayed on the touch screen display (for example, the touch screen display 930 of FIG. 9), the electronic device 101 (for example, the processor 120) may measure an intensity of the pressure input of the user and detect a pressure level of the pressure input.

According to various embodiments, in operation 1014, the electronic device 101 (for example, the processor 120) may perform one of a plurality of operations related to at least one object on the basis of at least a portion of the detected pressure level. The electronic device 101 (for example, the processor 120) may display a plurality of adjacent objects on the touch screen display (for example, the touch screen display 930 of FIG. 9) and select one or more objects on the basis of at least a portion of the location of the user input and the detected pressure level. The electronic device 101 (for example, the processor 120) may determine a plurality of objects corresponding to the detected pressure level and select one object from the determined plurality of objects. The electronic device 101 (for example, the processor 120) may determine a plurality of objects displayed on a position at which the pressure input of the user is detected and provide visual feedback to each of the plurality of objects according to the pressure input level or the intensity to allow the user to select a desired object. The electronic device 101 (for example, the processor 120) may select an object having a large value of depth information, that is, a deep object from the determined plurality of objects in proportion to the size of the detected pressure level. For example, the electronic device 101 (for example, the processor 120) may select an object having a small value of depth information when the pressure level is lower and select an object having a large value of depth information when the pressure level is higher. The electronic device 101 (for example, the processor 120) may provide different visual feedback to the selected objects and allow the user to recognize which object is selected.

According to various embodiments, the electronic device 101 (for example, the processor 120) may pair the determined plurality of objects. The electronic device 101 (for example, the processor 120) may pair the determined plurality of object in order to perform interworking such as data transmission/reception, control signal transmission/reception, and function control between the determined plurality of objects. For example, when the plurality of objects are indoor electronic devices such as a refrigerator, a television, a washing machine, a dishwasher, a cleaner, a rice cooker, an oven, and a home network system, the determined objects may be paired for function control and control signal transmission/reception. The electronic device 101 (for example, the processor 120) may pair the selected object and the electronic devices. The electronic device 101 (for example, the processor 120) may pair the selected object and the electronic device 101 in order to perform interworking such as data transmission/reception, control signal transmission/reception, and function control. The electronic device 101 (for example, the processor 120) may perform a specific function such as search for relevant information, purchase, and pairing of the selected object. The pairing may be performed for interworking such as data transmission/reception, control signal transmission/reception, and function control between the electronic devices 101. For example, when the selected object is an indoor electronic device (for example, the external electronic device 102 of FIG. 1) such as a refrigerator, a television, a washing machine, a dishwasher, a cleaner, a rice cooker, an oven, and a home network system, the electronic device 101 may be paired with the external electronic device 102 for function control and control signal transmission/reception.

According to various embodiments, the electronic device 101 (for example, the processor 120) may determine attributes of at least one of the selected object or an object, which is not selected, among the determined plurality of objects. The electronic device 101 (for example, the processor 120) may determine attributes of the selected object to be different from attributes of the object which is not selected. The electronic device 101 (for example, the processor 120) may display visual effects such as the visual effect of the selected object is different from the visual effect of the object which is not selected. The electronic device 101 (for example, the processor 120) may change and display the image on the basis of the determined attributes. When attributes of at least one object are determined on the basis of the pressure input of the user while at least one object is displayed, the electronic device 101 (for example, the processor 120) may apply the determined attributes to the displayed image and display the image. For example, the electronic device 101 (for example, the processor 120) may enlarge the size of the selected object at a predetermined magnitude and display the enlarged object. For example, the electronic device 101 (for example, the processor 120) may change and display a color of the selected object. For example, the electronic device 101 (for example, the processor 120) may transparently display the remaining parts except for a boundary of the object which is not selected, or may translucently display the object which is not selected.

According to various embodiments, when the number of user inputs is at least two, the electronic device 101 (for example, the processor 120) may more rapidly select one of the plurality of objects than the case in which the number of user inputs is one. Even though the pressure level of the one user input is the same as (or similar to) the pressure level of the two user inputs, the electronic device 101 (for example, the processor 120) may more rapidly select the object in the case in which two user inputs are detected than the case in which one user input is detected. For example, the electronic device 101 (for example, the processor 120) may more rapidly select the object in the case in which three user inputs are detected than the case in which two user inputs are detected.

According to various embodiments, the electronic device 101 (for example, the processor 120) may display a menu including at least one function related to the selected object in accordance with the location at which the selected object is displayed. The electronic device 101 (for example, the processor 120) may display a menu including various functions such as a function of searching for additional information related to the selected object, a function of purchasing the selected object, and a function of being paired with the selected object. The electronic device 101 (for example, the processor 120) may display the menu on one of the upper, lower, left, and right parts of the selected object. The electronic device 101 (for example, the processor 120) may insert different functions into the menu in accordance with attributes of the selected object and display the menu. For example, the electronic device 101 (for example, the processor 120) may display additional information corresponding to the selected object in accordance with the location at which the pre-selected object is displayed.

According to various embodiments, the electronic device 101 (for example, the processor 120) may determine whether additional information of the selected object is stored in a memory (for example, the memory module 940 of FIG. 9). For example, when the additional information of the selected object is not stored in the memory (for example, the memory module 940 of FIG. 9), the electronic device 101 (for example, the processor 120) may access a server (for example, the server 106 of FIG. 1) corresponding to the selected object and make a request for the additional information. When there is no additional information in the memory, the electronic device 101 (for example, the processor 120) may make a request for additional information corresponding to the selected object and receive the additional information in response to the request. When a request for information for authenticating the electronic device is received from the server, the electronic device 101 (for example, the processor 120) may transmit an identifier of the electronic device to the server in response to the request, and when the authentication is completed, receive the additional information from the server.

Figure 11:
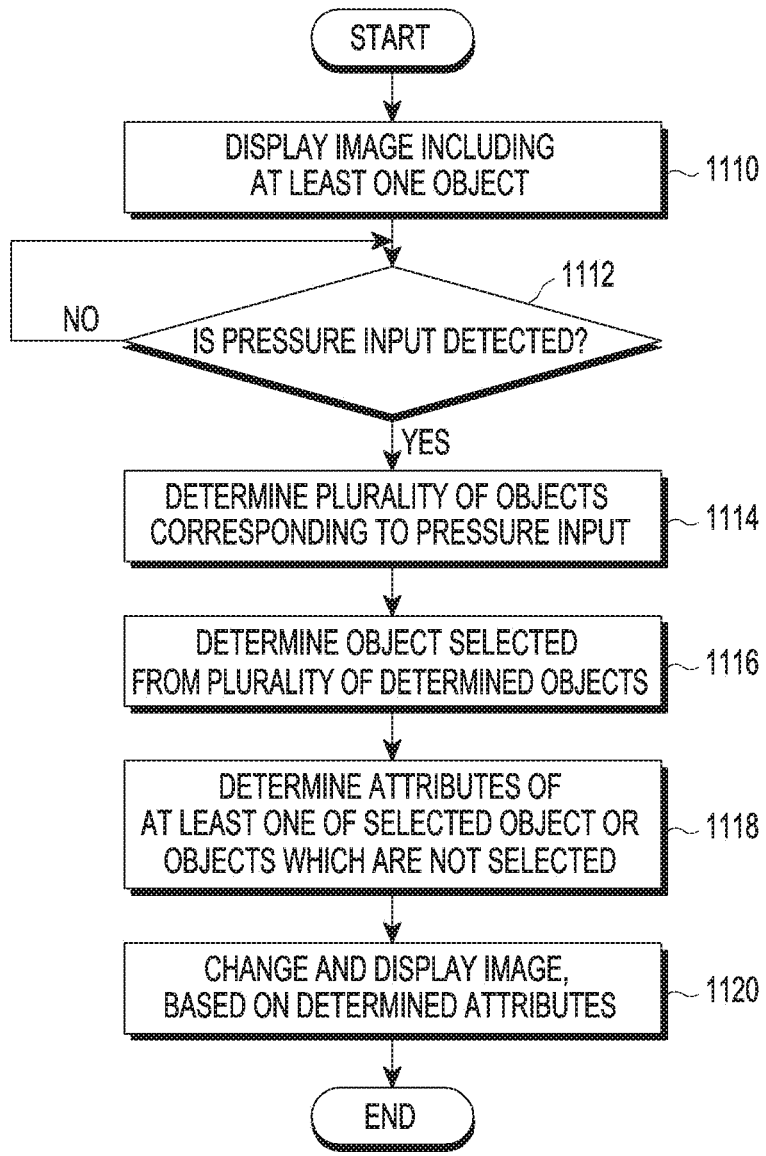
FIG. 11 is a flowchart illustrating an operation of determining and displaying attributes of an object on which a pressure input is detected in an image including at least one object according to various embodiments.

FIG. 11 is a flowchart illustrating an operation of determining and displaying attributes of an object on which a pressure input is detected in an image including at least one object according to various embodiments.

Hereinafter, the operation of determining and displaying attributes of an object on which a pressure input is detected in an image including at least one object according to various embodiments will be described in detail with reference to FIG. 11.

According to various embodiments, in operation 1110, the electronic device (for example, the processor 120) may display at least one object. The electronic device 101 (for example, the processor 120) may display at least one object on a touch screen display (for example, the touch screen display 930 of FIG. 9). The electronic device 101 (for example, the processor 120) may display a user interface including at least one object capable of performing various operations such as visual feedback and execution of at least one function on the basis of a pressure input of the user on the touch screen display (for example, the touch screen display 930 of FIG. 9). According to an embodiment, the electronic device 101 (for example, the processor 120) may display at least one object in a user interface on the touch screen display (for example, the touch screen display 930 of FIG. 9). The user interface may display at least one 3D object having depth information such as augmented reality and a 3-dimensional (3D) map. The user interface may insert at least one 3D object in a preview image acquired by the camera module (for example, the camera module 950 of FIG. 9) and display the preview image.

According to various embodiments, in operation 1112, the electronic device (for example, the processor 120) may detect the pressure input. The electronic device 101 (for example, the processor 120) may detect the pressure input of the user on a plurality of objects displayed to be adjacent to each other on the touch screen display (for example, the touch screen display 930 of FIG. 9). The electronic device 101 (for example, the processor 120) may detect a pressure level of the pressure input. The electronic device 101 (for example, the processor 120) may detect a pressure input made on an object selected by the user among the plurality of objects displayed on the touch screen display (for example, the touch screen display 930 of FIG. 9).

According to various embodiments, in operation 1114, the electronic device (for example, the processor 120) may determine a plurality of objects corresponding to the pressure input. The electronic device 101 (for example, the processor 120) may overlappingly display the plurality of objects on the touch screen display (for example, the touch screen display 930 of FIG. 9). The electronic device 101 (for example, the processor 120) may determine a plurality of objects corresponding to the location of the pressure input of the user on the plurality of displayed objects. For example, when the pressure input of the user is detected at a position at which the plurality of objects overlap, the electronic device 101 (for example, the processor 120) may determine the plurality of objects displayed at the position at which the pressure input is detected. In another example, when the pressure input of the user is detected at a position at which one object is displayed, the electronic device 101 (for example, the processor 120) may determine one object displayed at the position at which the pressure input is detected.

According to various embodiments, in operation 1116, the electronic device (for example, the processor 120) may determine an object selected from the determined plurality of objects. The electronic device 101 (for example, the processor 120) may determine a plurality of objects corresponding to the pressure input of the user and select one (or at least one) object from the determined plurality of objects. The electronic device 101 (for example, the processor 120) may determine a plurality of objects displayed at the position at which the pressure input of the user is detected and provide visual feedback to each of the plurality of objects according to an intensity of the pressure input to allow the user to select a desired object. The electronic device 101 (for example, the processor 120) may select an object having large depth information from the determined plurality of objects in proportion to the size of the detected pressure input. For example, the electronic device 101 (for example, the processor 120) may select an object having small depth information as the intensity of the pressure input is lower and select an object having large depth information as the intensity of the pressure input is higher. The electronic device 101 (for example, the processor 120) may provide different visual feedback to the selected objects and allow the user to recognize which object is selected.

According to various embodiments, in operation 1118, the electronic device (for example, the processor 120) may determine attributes of at least one of the selected object or an object which is not selected. The electronic device (for example, the processor 120) may determine attributes indicating whether at least one of the selected object or the object which is not selected is formed with a hard material, a soft material, or a pliant material. For example, the electronic device 101 (for example, the processor 120) may determine attributes of the selected object among the determined plurality of objects. In another example, the electronic device 101 (for example, the processor 120) may determine attributes of at least one of the remaining objects (for example, objects which are not selected) except for the selected object. The electronic device 101 (for example, the processor 120) may determine attributes of the selected object to be different from attributes of the object which is not selected. The electronic device (for example, the processor 120) may determine visual effects such that the visual effect of the selected object is different from attributes of each of the objects which are not selected.

For example, when it is determined that attributes (or property) of the object correspond to hard even though levels (or intensities) of the pressure inputs are the same, the electronic device (for example, the processor 120) may select an object at a faster movement speed between objects than the case in which attributes of the object correspond to pliant. In another example, when it is determined that attributes (or property) of the object correspond to pliant even though levels (or intensities) of the pressure inputs are the same, the electronic device (for example, the processor 120) may select with a slower movement speed between the objects than the case in which attributes of the object correspond to hard. Further, when it is determined that attributes (or property) of the object correspond to hard even though levels (or intensities) of the pressure inputs are the same, the electronic device (for example, the processor 120) may display the object with shallower visual feedback applied to the object than the case in which attributes correspond to pliant. For example, when an optical angle of the displayed object is wide or the object is zoomed out even though the same pressure input is detected, the electronic device (for example, the processor 120) may select the object with a faster movement speed than the case in which overlapping objects are zoomed in.

According to various embodiments, in operation 1120, the electronic device (for example, the processor 120) may change and display the image on the basis of determined attributes. The electronic device 101 (for example, the processor 120) may change and display the image on the basis of the determined attributes. When attributes of at least one object are determined on the basis of the pressure input of the user while at least one object is displayed, the electronic device 101 (for example, the processor 120) may apply the determined attributes to the displayed image and display the image. For example, the electronic device 101 (for example, the processor 120) may enlarge the size of the selected object at a predetermined magnitude and display the enlarged object. For example, the electronic device 101 (for example, the processor 120) may change and display a color of the selected object. For example, the electronic device 101 (for example, the processor 120) may transparently display the remaining parts except for a boundary of the object which is not selected. In another example, the electronic device 101 (for example, the processor 120) may translucently display the object which is not selected.

FIGS. 12A to 12H illustrate examples of selecting an object according to a pressure level and providing visual feedback to the selected object according to various embodiments.

Figure 12A:
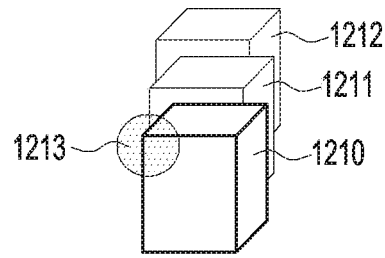
FIGS. 12A to 12H illustrate examples of selecting an object according to a pressure level and providing visual feedback to the selected object according to various embodiments.
Figure 12B:
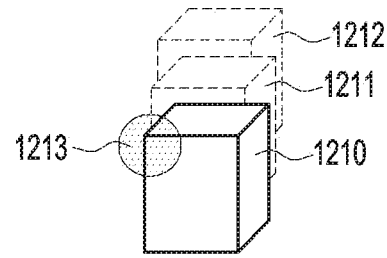

Referring to FIGS. 12A and 12B, the electronic device 101 (for example, the processor 120) according to various embodiments of the disclosure may display a plurality of objects 1210, 1211, and 1212 on a touch screen display (for example, the touch screen display 930 of FIG. 9) and detect a first pressure input 1213 made on the plurality of displayed objects 1210, 1211, and 1212. As illustrated in FIG. 12A, when the first object 1210 is selected according to the first pressure input 1213, the electronic device 101 (for example, the processor 120) may blurredly, translucently or transparently display other objects 1211 and 1212 except for the selected object 1210, that is, the objects 1211 and 1212 of FIG. 12B. For example, the electronic device 101 (for example, the processor 120) may translucently display boundaries of the objects 1211 and 1212 of FIG. 12B and transparently display other parts (for example, faces). In another example, the electronic device 101 (for example, the processor 120) may change a color of the selected object 1210 to another color and display the object in FIG. 12A.

Figure 12C:
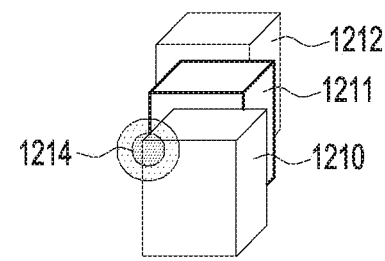
Figure 12D:
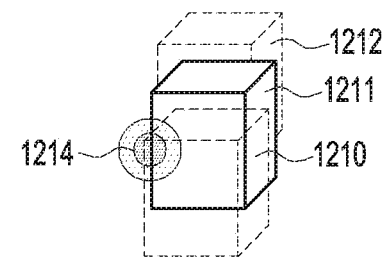

Referring to FIGS. 12C and 12D, the electronic device 101 (for example, the processor 120) according to various embodiments of the disclosure may detect a second pressure input 1214 made on a plurality of objects 1210, 1211, and 1212 displayed on a touch screen display (for example, the touch screen display 930 of FIG. 9). For example, an intensity of the second pressure input 1214 may be higher than an intensity of the first pressure input 1213. In another example, the intensity of the second pressure input may not be higher than the intensity of the first pressure input. As illustrated in FIG. 12C, when the second object 1211 is selected according to the second pressure input 1214, the electronic device 101 (for example, the processor 120) may display the other objects 1210 and 1210 except for the selected object 1211 blurredly, translucently, or transparently like the objects 1210 and 1212 of FIG. 12D, For example, the electronic device 101 (for example, the processor 120) translucently display boundaries of the objects 1210 and 1212 of FIG. 12D and transparently display other parts (for example, faces). In another example, the electronic device 101 (for example, the processor 120) may change a color of the object 1211 selected in FIG. 12C into another color and display the object 1211.

Figure 12E:
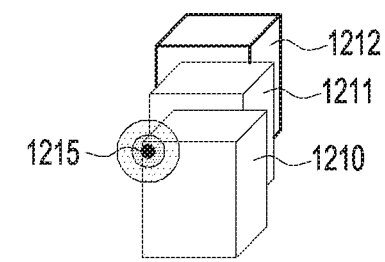
Figure 12F:
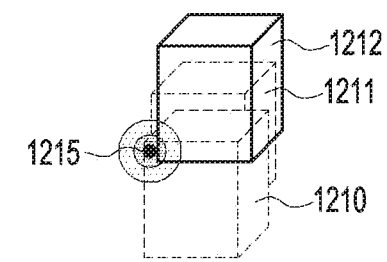

Referring to FIGS. 12E and 12F, the electronic device 101 (for example, the processor 120) may detect a third pressure input 1215 made on the plurality of objects 1210, 1211, and 1212 displayed on a touch screen display (for example, the touch screen display 930 of FIG. 9). For example, an intensity of the third pressure input may be higher than the intensity of the second pressure input. In another example, the intensity of the third pressure input may not be higher than the intensity of the second pressure input. As illustrated in FIG. 12E, when the third object 1212 is selected according the third pressure input 1215, the electronic device 101 (for example, the processor 120) may display the other objects 1210 and 1211 except for the selected object 1212 blurredly, translucently, or transparently like the objects 1210 and 1211 of FIG. 12F. For example, the electronic device 101 (for example, the processor 120) may translucently display boundaries of the objects 1210 and 1211 of FIG. 12F and transparently display other parts (for example, faces). In another example, the electronic device 101 (for example, the processor 120) may change a color of the object 1212 selected in FIG. 12E into another color and display the object 1212.

Figure 12G:
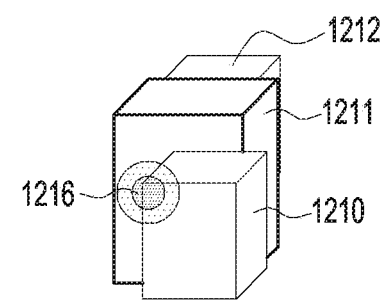
Figure 12H:
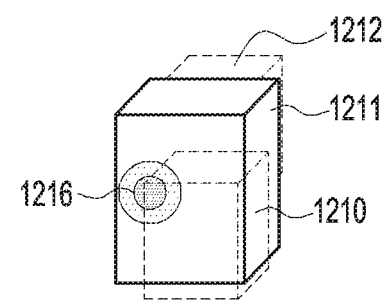

Referring to FIGS. 12G and 12F, the electronic device 101 (for example, the processor 120) may detect a fourth pressure input 1216 made on a plurality of objects 1210, 1211, and 1212 displayed on a touch screen display (for example, the touch screen display 930 of FIG. 9). For example, an intensity of the fourth pressure input may be the same as the intensity of the second pressure input. In another example, the intensity of the fourth pressure input may be different from the intensities of the first, second, and third pressure inputs. As illustrated in FIG. 12G, when the second object 1211 is selected according to the fourth pressure input 1216, the electronic device 101 (for example, the processor 120) may enlarge the selected object 1211 with a predetermined magnitude and display the object 1211. The electronic device 101 (for example, the processor 120) may display the other objects 1210 and 1212 except for the selected object 1211 blurredly, translucently, or transparently like the objects 1210 and 1212 of FIG. 12H. For example, the electronic device 101 (for example, the processor 120) may translucently display boundaries of the objects 1210 and 1212 of FIG. 12H and transparently display other parts (for example, faces). In another example, the electronic device 101 (for example, the processor 120) may change a color of the selected object 1211 to another color and display the object in FIG. 12G.

FIGS. 13A to 13H illustrate examples of selecting an object according to one or more pressure levels and providing visual feedback to the selected object according to various embodiments.

Figure 13A:
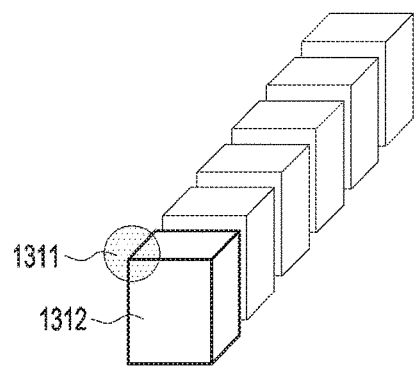
FIGS. 13A to 13H illustrate examples of selecting an object according to one or more pressure levels and providing visual feedback to the selected object according to various embodiments.
Figure 13B:
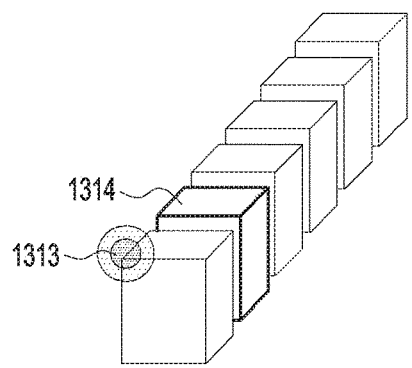
Figure 13C:
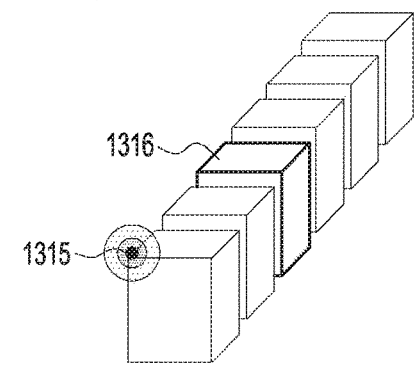

Referring to FIGS. 13A and 13C, the electronic device 101 (for example, the processor 120) may select a first object 1312 according to a first pressure input 1311 from a plurality of objects on a touch screen display (for example, the touch screen display 930 of FIG. 9). The electronic device 101 (for example, the processor 120) may select a second object 1314 having larger depth information than that of the first object 1312 when a second pressure input 1313 larger than the first pressure input 1311 is detected, and select a third object 1316 having larger depth information than that of the second object 1314 when a third pressure input 1315 larger than the second pressure input 1313 is detected.

Figure 13D:
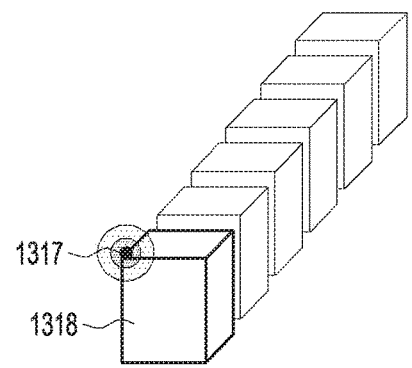
Figure 13E:
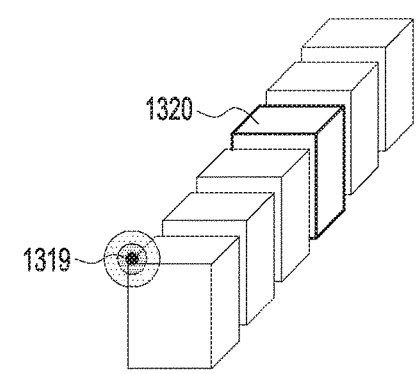
Figure 13F:
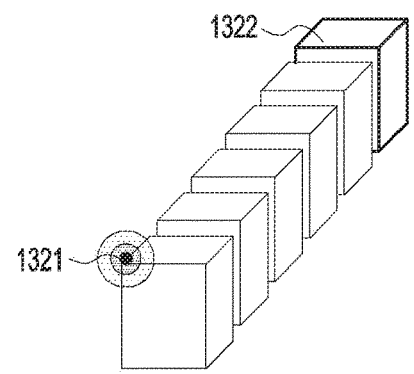

Referring to FIGS. 13D and 13F, the electronic device 101 (for example, the processor 120) according to various embodiments of the disclosure may select a fourth object 1318 according to a fourth pressure input 1317 from the plurality of objects on a touch screen display (for example, the touch screen display 930 of FIG. 9). The electronic device 101 (for example, the processor 120) may select a fifth object 1320 having larger depth information than that of the fourth object 1318 when a fifth pressure input 1319 larger than the fourth pressure input 1317 is detected, and select a sixth object 1322 having larger depth information than that of the fifth object 1314 when a sixth pressure input 1321 larger than the fifth pressure input 1319 is detected.

When a rate of an increase from the intensity of the first pressure input 1311 to the intensity of the third pressure input 1315 in FIGS. 13A to 13C is larger than a rate of an increase from the intensity of the fourth pressure input 1317 to the intensity of the sixth pressure input 1321 in FIGS. 13D to 13F, the electronic device 101 (for example, the processor 120) may select an object having larger depth information in proportion to an increase rate.

Figure 13G:
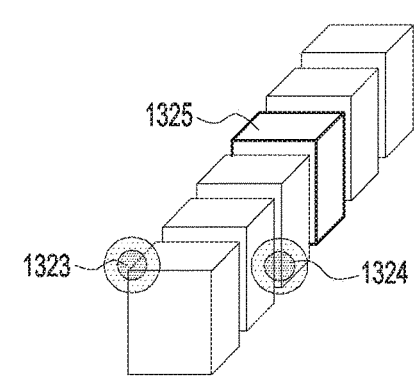
Figure 13H:
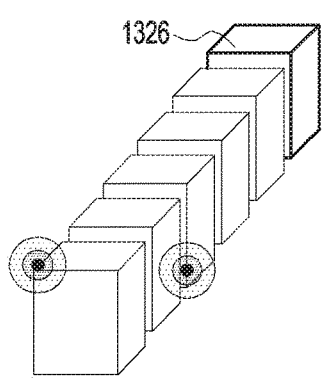

When two pressure inputs 1323 and 1324 are detected in FIGS. 13G and 13H, the electronic device 101 (for example, the processor 120) may select an object having deep depth information by increasing a movement speed for selecting an object compared to one pressure input 1313 detected in FIGS. 13A to 13F. For example, the electronic device 101 (for example, the processor 120) may calculate a distance between points at which the two pressure inputs 1323 and 1324 are detected, and when the calculated distance is within a predetermined distance, may select an object having larger depth information by increasing a movement speed for selecting the object compared to the detected one pressure input 1313. In another example, the electronic device 101 (for example, the processor 120) may control a movement speed for selecting an object in a direction of the larger pressure among the two pressure inputs 1323 and 1324. For example, when a pressure value of the second pressure input 1324 gradually becomes larger while a pressure value of the first pressure input 1323 is constantly maintained, the electronic device 101 (for example, the processor 120) may select an object having larger depth information by increasing a movement speed for selecting an object in a direction of the position at which the second pressure input 1324 is detected (for example, a right direction or a back direction). As illustrated in FIGS. 13A to 13H, the object may be selected by increasing the movement speed for selecting the object on the basis of at least one of the number of pressure inputs or the intensity of the pressure input.

Figure 14:
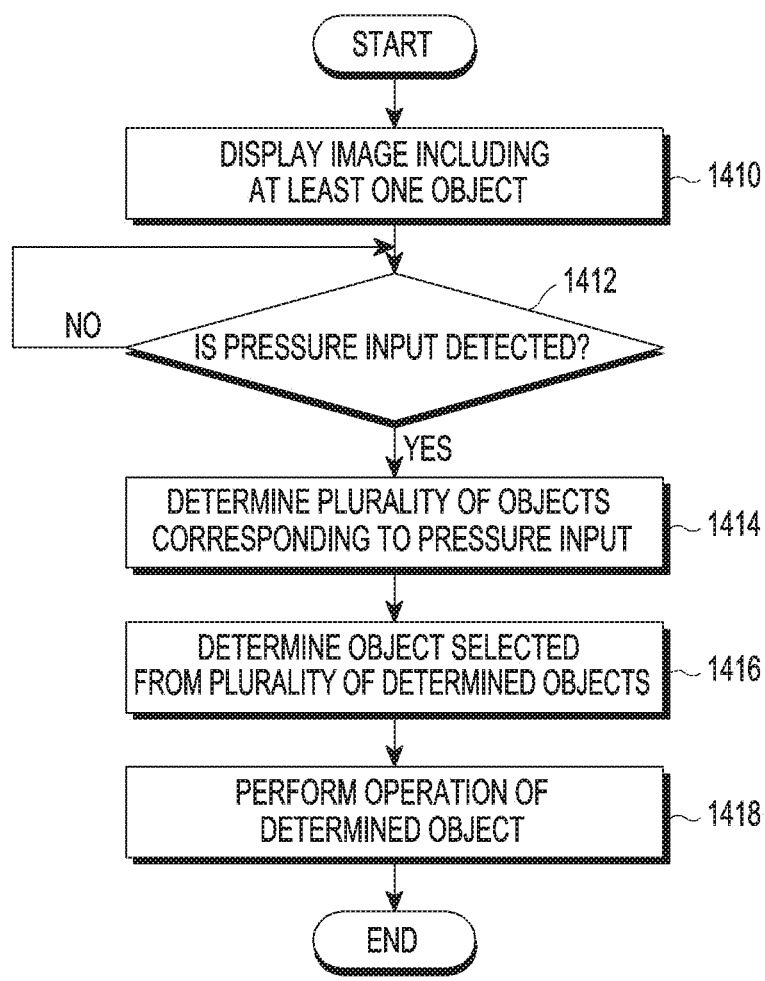
FIG. 14 is a flowchart illustrating an operation of determining an object on which a pressure input is detected in an image including at least one object and performing an operation according to various embodiments.

FIG. 14 is a flowchart illustrating an operation of determining an object on which a pressure input is detected in an image including at least one object and performing an operation according to various embodiments.

Hereinafter, the operation of determining an object on which a pressure input is detected in an image including at least one object and performing an operation according to various embodiments will be described with reference to FIG. 14.

According to various embodiments, in operation 1410, the electronic device (for example, the processor 120) may display at least one object. The electronic device 101 (for example, the processor 120) may display at least one object on a touch screen display (for example, the touch screen display 930 of FIG. 9). The electronic device 101 (for example, the processor 120) may display a user interface including at least one object capable of performing various operations such as visual feedback and execution of at least one function on the basis of a pressure input of the user on the touch screen display (for example, the touch screen display 930 of FIG. 9). According to an embodiment, the electronic device 101 (for example, the processor 120) may display at least one object in a user interface on the touch screen display (for example, the touch screen display 930 of FIG. 9). The user interface may display at least one 3D object having depth information such as augmented reality and a 3-dimensional (3D) map. The user interface may insert at least one 3D object in a preview image acquired by the camera module (for example, the camera module 950 of FIG. 9) and display the preview image. The electronic device 101 (for example, the processor 120) may display at least one object for performing at least one operation on the basis of a pressure input of the user on a touch screen display (for example, the touch screen display 930 of FIG. 9).

According to various embodiments, in operation 1412, the electronic device (for example, the processor 120) may detect the pressure input. The electronic device 101 (for example, the processor 120) may detect the pressure input of the user on a plurality of objects displayed to be adjacent to each other on the touch screen display (for example, the touch screen display 930 of FIG. 9). The electronic device 101 (for example, the processor 120) may detect a pressure level of the pressure input. The electronic device 101 (for example, the processor 120) may detect a pressure input made on an object selected by the user among the plurality of objects displayed on the touch screen display (for example, the touch screen display 930 of FIG. 9).

According to various embodiments, in operation 1414, the electronic device (for example, the processor 120) may determine a plurality of objects corresponding to the pressure input. The electronic device 101 (for example, the processor 120) may overlappingly display the plurality of objects on the touch screen display (for example, the touch screen display 930 of FIG. 9). The electronic device 101 (for example, the processor 120) may determine a plurality of objects corresponding to positions of pressure inputs of the user on the plurality of displayed objects. For example, when the pressure input of the user is detected at a position at which the plurality of objects overlap, the electronic device 101 (for example, the processor 120) may determine the plurality of objects displayed at the position at which the pressure input is detected. In another example, when the pressure input of the user is detected at a position at which one object is displayed, the electronic device 101 (for example, the processor 120) may determine one object displayed at the position at which the pressure input is detected. For example, the electronic device 101 (for example, the processor 120) may determine a plurality of objects for executing at least one operation in accordance with the pressure input of the user.

According to various embodiments, in operation 1416, the electronic device (for example, the processor 120) may determine an object selected from the determined plurality of objects. The electronic device 101 (for example, the processor 120) may determine a plurality of objects corresponding to the pressure input of the user and select one (or at least one) object from the determined plurality of objects. The electronic device 101 (for example, the processor 120) may determine a plurality of objects displayed at the position at which the pressure input of the user is detected and provide visual feedback to each of the plurality of objects according to an intensity of the pressure input to allow the user to select a desired object. The electronic device 101 (for example, the processor 120) may select an object having large depth information from the determined plurality of objects in proportion to the size of the detected pressure input. For example, the electronic device 101 (for example, the processor 120) may select an object having small depth information as the intensity of the pressure input is smaller and select an object having large depth information as the intensity of the pressure input is larger. The electronic device 101 (for example, the processor 120) may provide different visual feedback to the selected objects and allow the user to recognize which object is selected.

According to various embodiments, in operation 1418, the electronic device 101 (for example, the processor 120) may perform an operation for the selected object among the determined plurality of objects. The electronic device 101 (for example, the processor 120) may display a menu including at least one function related to the determined objects at the position at which the determined objects are displayed. The electronic device 101 (for example, the processor 120) may display a menu including various functions such as a function of searching for additional information related to the determined objects, a function of purchasing the determined objects, and a function of pairing with the determined objects. The functions included in the menu may vary depending on characteristics of the objects. For example, when the determined object is an electronic device (for example, the external electronic device 102 of FIG. 1) capable of performing communication, the menu may include a function of pairing with the external electronic device 102. In another example, when the determined object is food that a person can eat and has an expiration date, the menu may include various functions of checking the expiration date, price, and a site presenting the lowest price of the object. The electronic device 101 (for example, the processor 120) may display the menu on one part of upper, lower, left, and right parts of the selected object. The electronic device 101 (for example, the processor 120) may insert different functions into the menu in accordance with attributes of the selected object and display the menu. For example, the electronic device 101 (for example, the processor 120) may display additional information corresponding to the selected object in accordance with the location at which the pre-selected object is displayed. In another example, when the selected object is a home appliance (for example, a television, a refrigerator, a washing machine, a dishwasher, microwave oven, an oven, an audio system, an air-conditioner, a light, a boiler and a video player), the electronic device may perform a predetermined function of the selected object or display a detailed screen. The predetermined function may vary depending on the type of the home appliance. For example, the predetermined function may include a plurality of generally and frequently used functions of the corresponding home appliance such as an on/off operation of the selected object (for example, the home appliance).

FIGS. 15A to 15F illustrate examples of selecting an object according to a pressure level and displaying a menu corresponding to the selected object according to various embodiments.

Figure 15A:
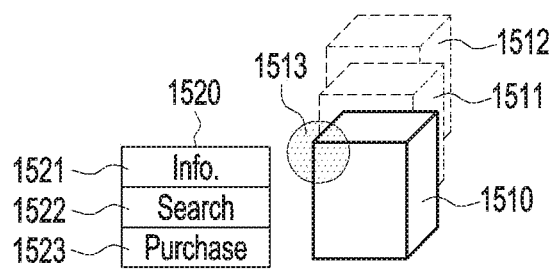
FIGS. 15A to 15F illustrate examples of selecting an object according to a pressure level and displaying a menu corresponding to the selected object according to various embodiments.
Figure 15B:
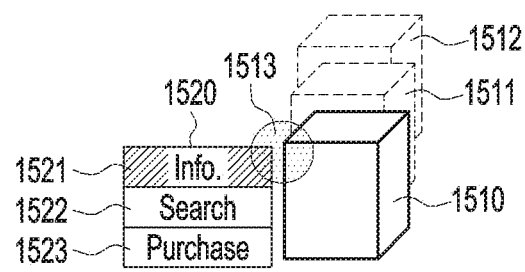

Referring to FIGS. 15A and 15B, the electronic device 101 (for example, the processor 120) according to various embodiments may display a plurality of objects 1510, 1511, and 1512 on a touch screen display (for example, the touch screen display 930 of FIG. 9) and detect a first pressure input 1513 made on the plurality of displayed objects 1510, 1511, and 1512. As illustrated in FIG. 15A, when the first object 1510 is selected according to the first pressure input 1513, the electronic device 101 (for example, the processor 120) may display a menu 1520 including at least one function related to the selected object 1510. For example, the menu 1520 may be displayed on one of the upper left side, lower left side, upper right side, or lower right side of the selected object 1510. For example, the menu 1520 may be displayed at a position where the user can easily see the menu. The menu 1520 may include a function 1521 of searching for information on the selected object 1510 (for example, a manufactured date, an expiration date, a manufacturing company, and a price), a function 1522 of searching for more detailed information related to the selected object 1510 (for example, ingredients and effects on the body), and a function 1523 required for purchasing the selected object 1510 (for example, a purchase site and a site for the lowest price). The menu 1520 may include different functions according to the type or characteristic of the selected object 1510. According to another embodiment, the other objects 1511 and 1512 except for the selected object 1510 may be blurredly, translucently, or transparently displayed. For example, the electronic device 101 (for example, the processor 120) may translucently display boundaries of the other objects 1511 and 1512 and transparently display other parts (for example, faces). As illustrated in FIG. 15B, when the user makes, for example, the first pressure input 1513, the menu 1520 for the selected object 1510 may be displayed, and when a function 1521 included in the displayed menu 1520 is selected, an execution result of the selected function 1521 may be displayed. For example, the function 1521 may be selected on the basis of a drag which is a gesture for moving to a position at which the function 1521 is displayed by a predetermined distance in the state in which the touch is maintained after the first pressure input 1513 or a swipe gesture. When the touch based on the drag or the swipe gesture is released, the function 1521 may be performed.

Figure 15C:
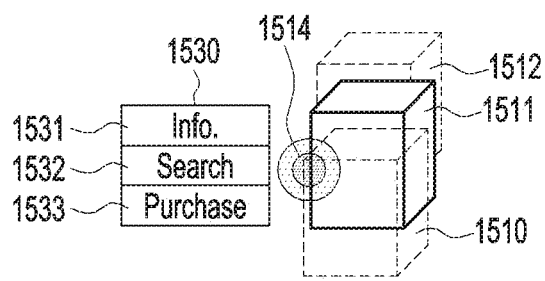
Figure 15D:
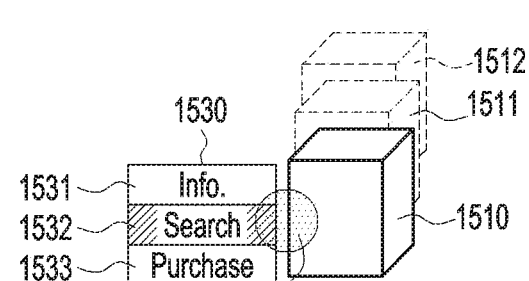

Referring to FIGS. 15C and 15D, the electronic device 101 (for example, the processor 120) according to various embodiments of the disclosure may detect the second pressure input 1514 made on the plurality of displayed objects 1510, 1511, and 1512. The intensity of the second pressure input 1514 may be higher than the intensity of the first pressure input 1513. As illustrated in FIG. 15C, when the second object 1511 is selected according to the second pressure input 1514, the electronic device 101 (for example, the processor 120) may display a menu 1530 including at least one function related to the selected object 1511 on one side of the selected object 1511. For example, the menu 1530 may be displayed on one of the upper left side, lower left side, upper right side, or lower right side of the selected object 1511. For example, the menu 1530 may be displayed at a position where the user can easily see the menu. The menu 1530 may include a function 1511 of searching for information on the selected object 1531 (for example, a manufactured date, an expiration date, a manufacturing company, and a price), a function 1511 of searching for more detailed information related to the selected object 1532 (for example, ingredients and effects on the body), and a function 1511 required for purchasing the selected object 1533 (for example, a purchase site and a site for the lowest price). The menu 1530 may include different functions according to the type or characteristic of the selected object 1511. According to another embodiment, the other objects 1510 and 1512 except for the selected object 1511 may be blurredly, translucently, or transparently displayed. For example, the electronic device 101 (for example, the processor 120) may translucently display boundaries of the other objects 1510 and 1512 and transparently display other parts (for example, faces). As illustrated in FIG. 15D, when the user makes, for example, the second pressure input 1515, the menu 1530 for the selected object 1511 may be displayed, and when a function 1532 included in the displayed menu 1530 is selected, an execution result of the selected function 1532 may be displayed.

Figure 15E:
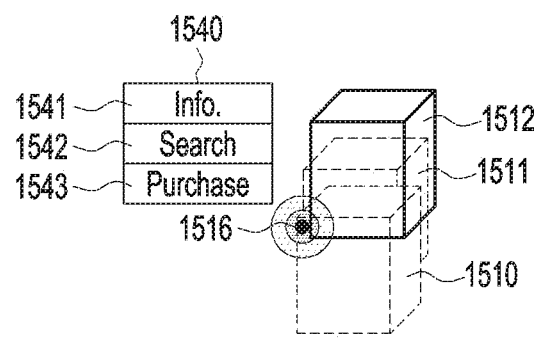
Figure 15F:
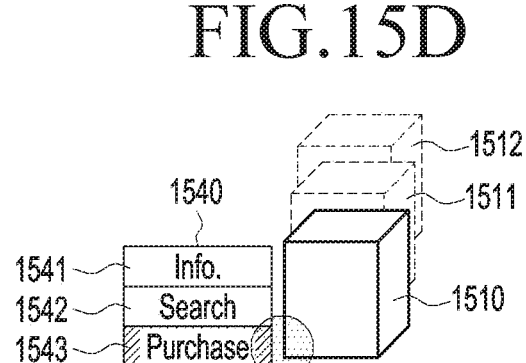

Referring to FIGS. 15E and 15F, the electronic device 101 (for example, the processor 120) according to various embodiments of the disclosure may detect the touch pressure input 1516 on the plurality of displayed objects 1510, 1511, and 1512. The intensity of the fourth pressure input 1516 may be higher than the intensity of the second pressure input 1514. As illustrated in FIG. 15E, when the third object 1512 is selected according to the fourth pressure input 1515, the electronic device 101 (for example, the processor 120) may display a menu 1540 including at least one function related to the selected object 1512 on one side of the selected object 1512. For example, the menu 1540 may be displayed on one of the upper left side, lower left side, upper right side, or lower right side of the selected object 1512. For example, the menu 1540 may be displayed at a position where the user can easily see the menu. The menu 1540 may include a function 1512 of searching for information on the selected object 1541 (for example, a manufactured date, an expiration date, a manufacturing company, and a price), a function 1512 of searching for more detailed information related to the selected object 1542 (for example, ingredients and effects on the body), and a function 1512 required for purchasing the selected object 1543 (for example, a purchase site and a site for the lowest price). The menu 1540 may include different functions according to the type or characteristic of the selected object 1512. According to another embodiment, the other objects 1510 and 1511 except for the selected object 1512 may be blurredly, translucently, or transparently displayed. For example, the electronic device 101 (for example, the processor 120) may translucently display boundaries of the other objects 1510 and 1511 and transparently display other parts (for example, faces). As illustrated in FIG. 15F, when the user makes, for example, the fifth pressure input 1517, a menu 1540 for the selected object 1512 may be displayed, and when a function 1543 included in the displayed menu 1540 is selected, an execution result of the selected function 1543 may be displayed.

FIGS. 16A to 16D illustrate various examples of selecting a function of a menu in the state in which an object is selected based on a pressure input according to various embodiments.

Figure 16A:
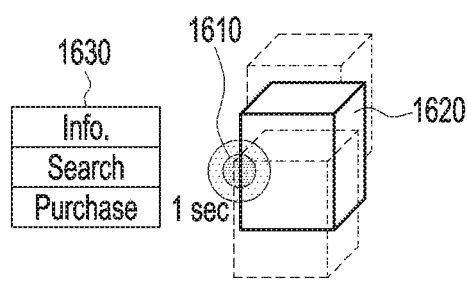
FIGS. 16A to 16D illustrate various examples of selecting a function of a menu in the state in which an object is selected on the basis of a pressure input according to various embodiments.

Referring to FIG. 16A, when a predetermined time (for example, 1 sec) elapses after an object 1620 is selected by a first pressure input 1610, the electronic device 101 (for example, the processor 120) according to various embodiments may display a menu 1630 including at least one function related to the selected object 1620 on one side of the selected object 1620. For example, the menu 1630 may be displayed on one of the upper left side, lower left side, upper right side, or lower right side of the selected object 1620.

Figure 16B:
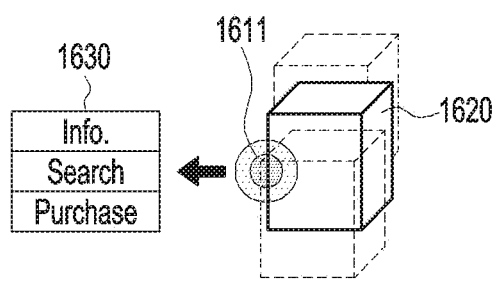

Referring to FIG. 16B, when a drag or a swipe gesture is input in a specific direction (for example, a left direction of a third pressure input) after the object 1620 is selected by a second pressure input 1611, the electronic device 101 (for example, the processor 120) according to various embodiments may display the menu 1630 including at least one function related to the selected object 1620 on one side of the selected object 1620. For example, the menu 1630 may be displayed in the specific direction.

Figure 16C:
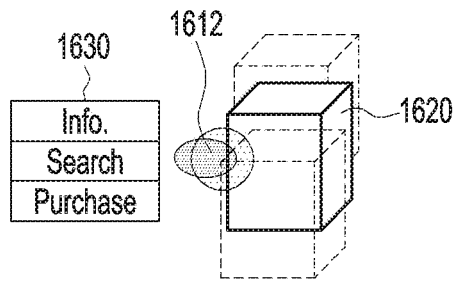

Referring to FIG. 16C, when a predetermined gesture is input in a specific direction (for example, a left direction of the third pressure input) after the object 1620 is selected by the third pressure input 1612, the electronic device 101 (for example, the processor 120) according to various embodiments may display the menu 1630 including at least one function related to the selected object 1620 on one side of the selected object 1620. For example, the predetermined gesture may include a shear force gesture of applying forces while rolling a finger in a specific direction or a touch & drag gesture. For example, the menu 1630 may be displayed in a movement direction of the shear force gesture or the touch & drag from the object 1620.

Figure 16D:
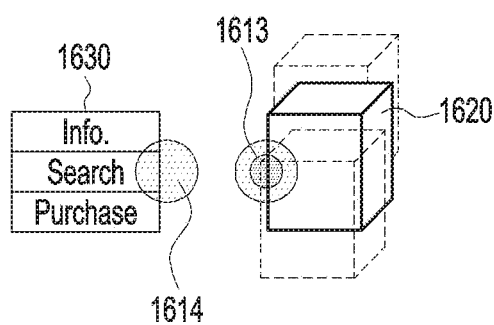

Referring to FIG. 16D, when an input of a touch is detected at a specific position in the state in which a fourth pressure input 1613 is not released after the object 1620 is selected by the fourth pressure input 1613, the electronic device 101 (for example, the processor 120) according to various embodiments of the disclosure may display the menu 1630 including at least one function related to the selected object 1620 at the position at which the touch is detected. For example, the menu 1630 may be displayed in a movement direction of the touch & drag from the object 1620.

FIGS. 17A to 17F illustrate examples of selecting an object according to a pressure input and displaying additional information corresponding to the selected object according to various embodiments.

Figure 17A:
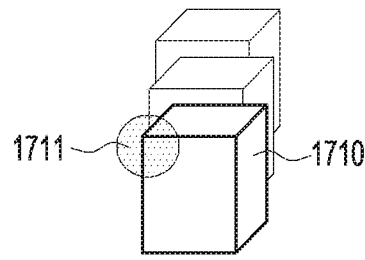
FIGS. 17A to 17F illustrate examples of selecting an object according to a pressure input and displaying additional information corresponding to the selected object according to various embodiments.
Figure 17B:
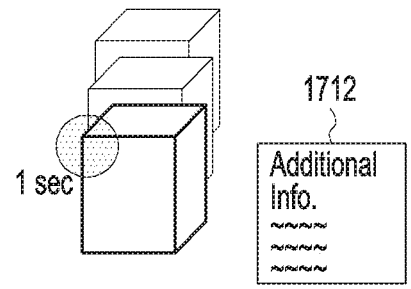

Referring to FIGS. 17A and 17B, the electronic device 101 (for example, the processor 120) according to various embodiments may detect a first pressure input 1711 made on a first object 1710. As illustrated in FIG. 17A, when the first object 1710 is selected according to the first pressure input 1711, the electronic device 101 (for example, the processor 120) may display additional information 1712 related to the selected object 1710 on one side of the selected object 1710. For example, when a predetermined time (for example, 1 sec) elapses after the first object 1710 is selected according to the first pressure input 1711, the electronic device 101 (for example, the processor 120) may display the additional information 1712 related to the selected object 1710 on one side of the selected object 1710. The additional information 1712 may include more detailed information on the selected object 1710 and may be stored in a memory of the electronic device 101 (for example, the memory module 940 of FIG. 9). In another example, when the additional information 1712 is not stored in the memory of the electronic device 101 (for example, the memory module 940 of FIG. 9), the electronic device 101 (for example, the processor 120) may make a request for the additional information to a server (for example, the server 160 of FIG. 1) in response to detection of the first pressure input 1711 and receive the same. The additional information 1712 may include different pieces of additional information according to the type or characteristic of the selected object 1710. For example, other objects except for the selected object 1710 may be blurredly, translucently, or transparently displayed.

Figure 17C:
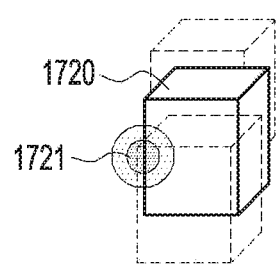
Figure 17D:
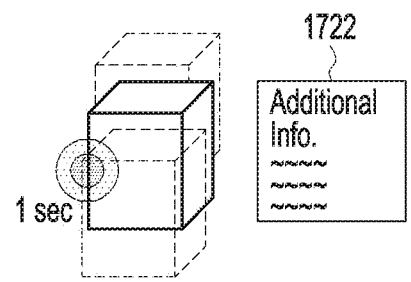

Referring to FIGS. 17C and 17D, the electronic device 101 (for example, the processor 120) may detect a second pressure input 1721 made on the second object 1720. When the second object 1720 is selected according to the second pressure input 1721 as illustrated in FIG. 17C, the electronic device 101 (for example, the processor 120) may display additional information 1722 related to the selected second object 1720 on one side of the selected second object 1720 as illustrated in FIG. 17D. For example, the intensity (or pressure level) of the second pressure input 1721 may be higher than the intensity (or pressure level) of the first pressure input 1711. In another example, depth information of the second object 1720 determined by the second pressure input 1721 may be larger than depth information of the first object 1710 determined by the first pressure input 1711. For example, when a predetermined time (for example, 1 sec) elapses after the second object 1720 is selected according to the second pressure input 1721, the electronic device 101 (for example, the processor 120) may display the additional information 1722 related to the selected second object 1720 on one side of the selected second object 1720. The additional information 1722 may include more detailed information on the selected second object 1720 and may be stored in a memory of the electronic device 101 (for example, the memory module 940 of FIG. 9). In another example, when the additional information 1722 is not stored in the memory of the electronic device 101 (for example, the memory module 940 of FIG. 9), the electronic device 101 (for example, the processor 120) may make a request for the additional information to a server (for example, the server 160 of FIG. 2) in response to detection of the first pressure input 1721 and receive the same.

Figure 17E:
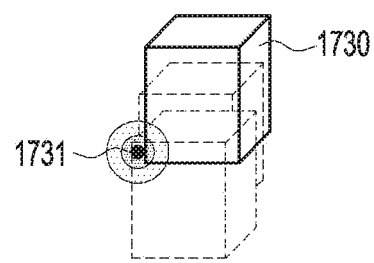
Figure 17F:
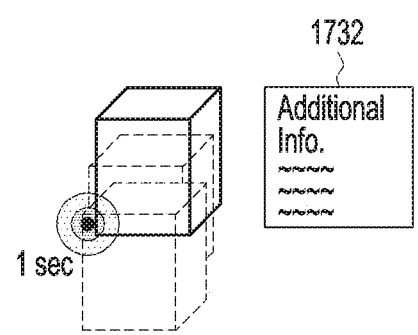

Referring to FIGS. 17E and 17F, the electronic device 101 (for example, the processor 120) according to various embodiments of the disclosure may detect a third pressure input 1731 made on a third object 1730. When the third object 1730 is selected according to the third pressure input 1731 as illustrated in FIG. 17E, the electronic device 101 (for example, the processor 120) may display additional information 1732 related to the selected third object 1730 on one side of the selected third object 1730 as illustrated in FIG. 17F. For example, the intensity (or pressure level) of the third pressure input 1731 may be higher than the intensity (or pressure level) of the second pressure input 1721. In another example, depth information of the third object 1730 determined by the third pressure input 1731 may be larger than depth information of the second object 1720 determined by the second pressure input 1721. For example, when a predetermined time (for example, 1 sec) elapses after the third object 1730 is selected according to the third pressure input 1731, the electronic device 101 (for example, the processor 120) may display the additional information 1732 related to the selected third object 1730 on one side of the selected second object 1730. The additional information 1732 may include more detailed information on the selected third object 1730 and may be stored in a memory of the electronic device 101 (for example, the memory module 940 of FIG. 9). In another example, when the additional information 1732 is not stored in the memory of the electronic device 101 (for example, the memory module 940 of FIG. 9), the electronic device 101 (for example, the processor 120) may make a request for the additional information to a server (for example, the server 160 of FIG. 3) in response to detection of the first pressure input 1731 and receive the same.

Figure 18:
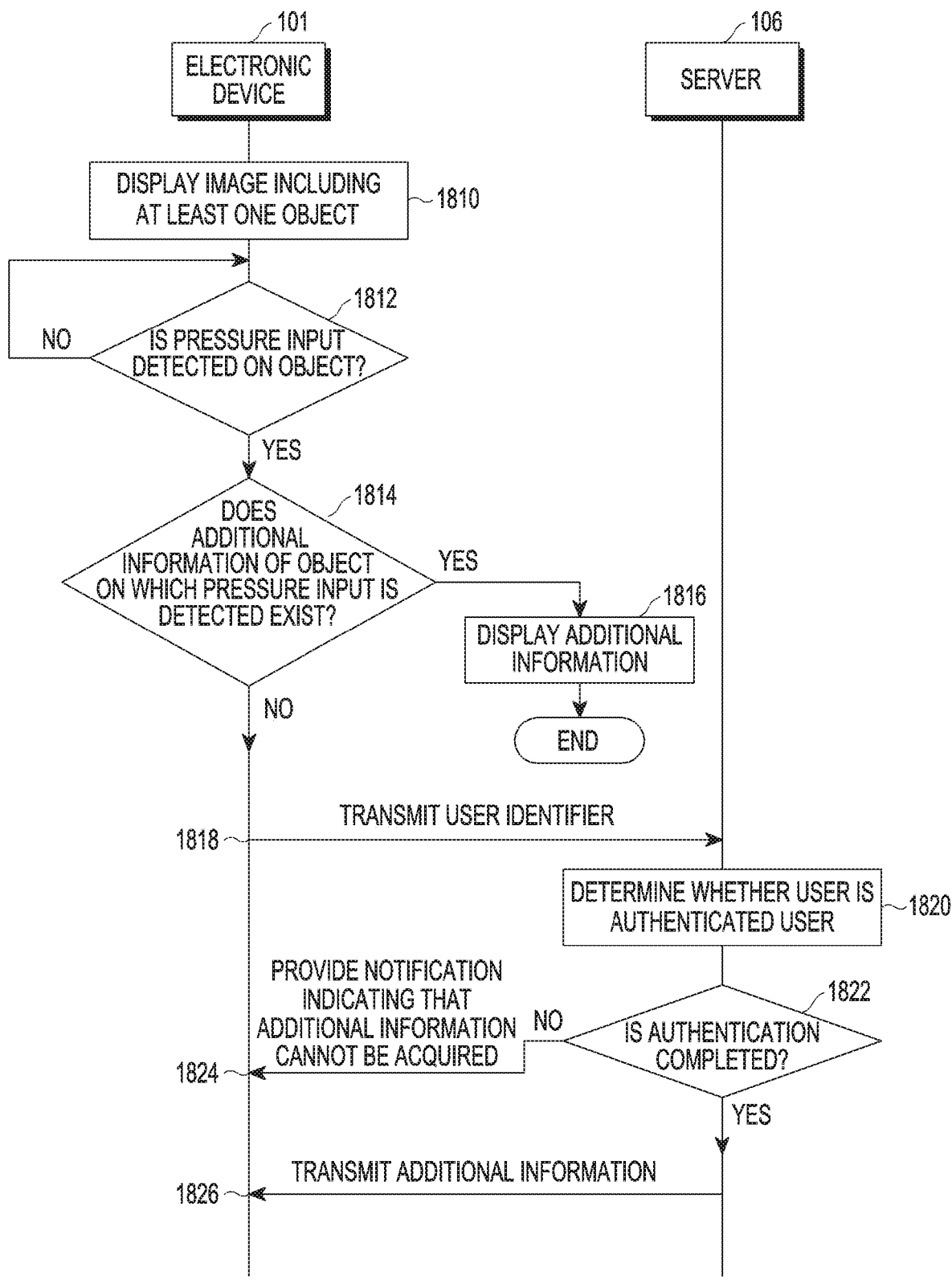
FIG. 18 is a flowchart illustrating an operation in which the electronic device acquires additional information from a server according to various embodiments.

FIG. 18 is a flowchart illustrating an operation in which an electronic device acquires additional information from a server according to various embodiments.

Hereinafter, the operation in which the electronic device acquires additional information from the server according to various embodiments will be described with reference to FIG. 18.

According to various embodiments, in operation 1810, the electronic device 101 (for example, the processor 120) may display at least one object. The electronic device 101 (for example, the processor 120) may display an image including at least one object on a touch screen display (for example, the touch screen display 930 of FIG. 9). The electronic device 101 (for example, the processor 120) may display a user interface including at least one object for performing various operations of displaying additional information on the basis of a pressure input of the user on the touch screen display (for example, the touch screen display 930 of FIG. 9) and performing at least one function. According to an embodiment, the electronic device 101 (for example, the processor 120) may display at least one object in a user interface on the touch screen display (for example, the touch screen display 930 of FIG. 9). The user interface may display at least one 3D object having depth information such as augmented reality and a 3-dimensional (3D) map. The user interface may insert at least one 3D object in a preview image acquired by the camera module (for example, the camera module 950 of FIG. 9) and display the preview image.

According to various embodiments, in operation 1812, the electronic device 101 (for example, the processor 120) may determine whether the pressure input is detected on the object. The electronic device 101 (for example, the processor 120) may detect the pressure input of the user on a plurality of objects displayed to be adjacent to each other on the touch screen display (for example, the touch screen display 930 of FIG. 9). The electronic device 101 (for example, the processor 120) may detect a pressure input made on an object selected by the user among the plurality of objects displayed on the touch screen display (for example, the touch screen display 930 of FIG. 9). For example, the user may make a pressure input in order to acquire more detailed additional information on the object. The additional information may be provided to all users or some authorized users. For example, the additional information may be provided to employees of an organization associated with the corresponding object (for example, employees of a company that produces the object or a manager associated with the object) in which case the additional information may not be provided to all users but may be provided to some users allowed to access or read. In order to selectively provide the additional information, the server 106 which provides the additional information may determine whether to provide the additional information after a user authentication process when a user request is made.

According to various embodiments, in operation 1814, the electronic device 101 (for example, the processor 120) may determine whether the server has additional information on the object on which the pressure input is detected. The electronic device 101 (for example, the processor 120) may determine whether the additional information on the object is stored in a memory (for example, the memory module 940 of FIG. 9). For example, when the additional information of the object is not stored in the memory (for example, the memory module 940 of FIG. 9), the electronic device 101 (for example, the processor 120) may determine whether the additional information is stored in the memory (for example, the memory module 940 of FIG. 9) in order to access a server (for example, the server 106 of FIG. 1) corresponding to the selected object and make a request for the additional information.

According to various embodiments, in operation 1816, the electronic device 101 (for example, the processor 120) may display the additional information. When the additional information of the selected object is stored in the memory (for example, the memory module 940 of FIG. 9), the electronic device 101 (for example, the processor 120) may display the stored additional information.

According to various embodiments, in operation 1818, the electronic device 101 (for example, the processor 120) may transmit a user identifier to the server (for example, the server 106 of FIG. 1). When the additional information on the selected object is not stored in the memory (for example, the memory module 940 of FIG. 9), the electronic device 101 (for example, the processor 120) may access the server (for example, the server 106 of FIG. 1) corresponding to the selected object and make a request for the additional information. When the electronic device 101 (for example, the processor 120) transmits the request for the additional information to the server 106, the electronic device 101 may receive a request for the user identifier from the server 106. Thereafter, the electronic device 101 may transmit the user identifier to the server 106. For example, when the object is a building, the user may acquire additional information on internal structural drawings of the building (for example, a steel-frame structure, a name and an address of an entered company on each store in the building, and real estate information) from the server 106 via an authentication process. For example, when the object is a building, displaying a screen for the interior of the building may be performed on the basis of an intensity or a position of a gesture input followed by a building selection input. For example, when a touch input moves to a detailed image and then a pressure input is detected at a specific position again, the screen for the interior of the building may be displayed at the corresponding position.

According to various embodiments, in operation 1820, the server 106 may perform a process of authenticating the user of the electronic device 101 on the basis of the received user identifier. The server 106 may compare the user identifier received from the electronic device 101 with a user identifier stored in a memory (not shown) of the server 106 and determine whether the electronic device 101 is an authenticated (or allowed) electronic device or a non-authenticated (or non-allowed) electronic device. The authentication may be performed when the additional information is information that should be confidential. For example, the authentication may be performed to provide additional information merely to the electronic device 101 which has completed the authentication.

According to various embodiments, in operation 1822, the server 106 may complete the authentication. The server 106 may complete the process of authenticating the electronic device 101 by comparing the user identifier received from the electronic device 101 with the user identifier stored in the memory (not shown) of the server 106.

According to various embodiments, when the authentication is not completed in operation 1824, the server 106 may inform the electronic device 101 that the additional information cannot be acquired. When the electronic device 101 is not the authenticated (or allowed) electronic device, the server 106 may transmit notification indicating that the additional information cannot be provided to the electronic device 101.

According to various embodiments, when the authentication is completed, the server 106 may transmit the additional information to the electronic device 101 in operation 1826. When the electronic device 101 is an authenticated (or allowed) electronic device, the server 106 may transmit the additional information to the electronic device 101. The electronic device 101 may display the additional information received from the server 106.

Figure 19:
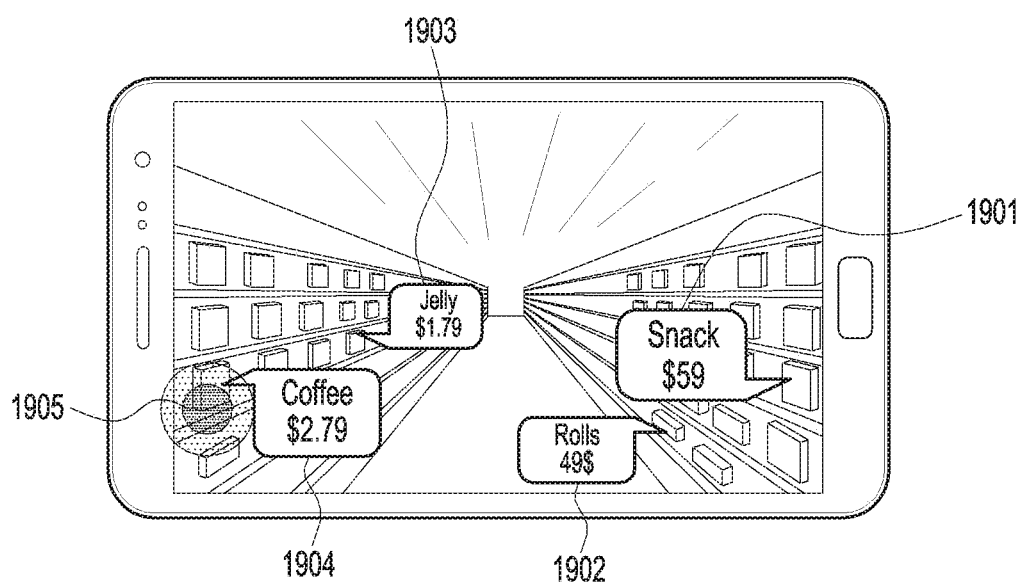
FIG. 19 illustrates an example of selecting an object on the basis of a pressure input in an image including a plurality of objects and displaying a menu corresponding to the selected object according to an embodiment.

FIG. 19 illustrates an example of selecting an object on the basis of a pressure input in an image including a plurality of objects and displaying a menu corresponding to the selected object according to an embodiment.

Referring to FIG. 19, an electronic device (for example, the processor 120) may display an image including a plurality of objects for displaying a menu (or information) in accordance with a pressure input on a display (for example, the display 160 of FIG. 1). For example, when a pressure input 1905 is detected on an object in the state in which an image including a plurality of objects is displayed on the display (for example, the display 160 of FIG. 1), a menu 1904 (or information) of the detected object may be displayed. For example, when the pressure input 1905 is detected on the object (or corresponding menu) in the state in which an image including a plurality of objects and a menu (or information) of each object is displayed on the display (for example, the display 160 of FIG. 1), another object having larger depth information than that of the detected object (or corresponding menu) may be selected or a menu corresponding to the other object may be displayed. For example, when the image is an image captured in a store that sells various products, each object may include various products which can be sold to customers (for example, food, kitchen utensils, industrial goods, and daily goods). The image may display a menu (or information) of each product on one side of the various products. For example, when the image is an image captured in a store that sells various products, the electronic device (for example, the processor 120) may identify objects for providing menus (or information) or additional information 1901, 1902, 1903, and 1904 among the various products and display an image in which the additional information is displayed on one side of each of the identified objects on the display (for example, the display 160 of FIG. 1).

Figure 20:
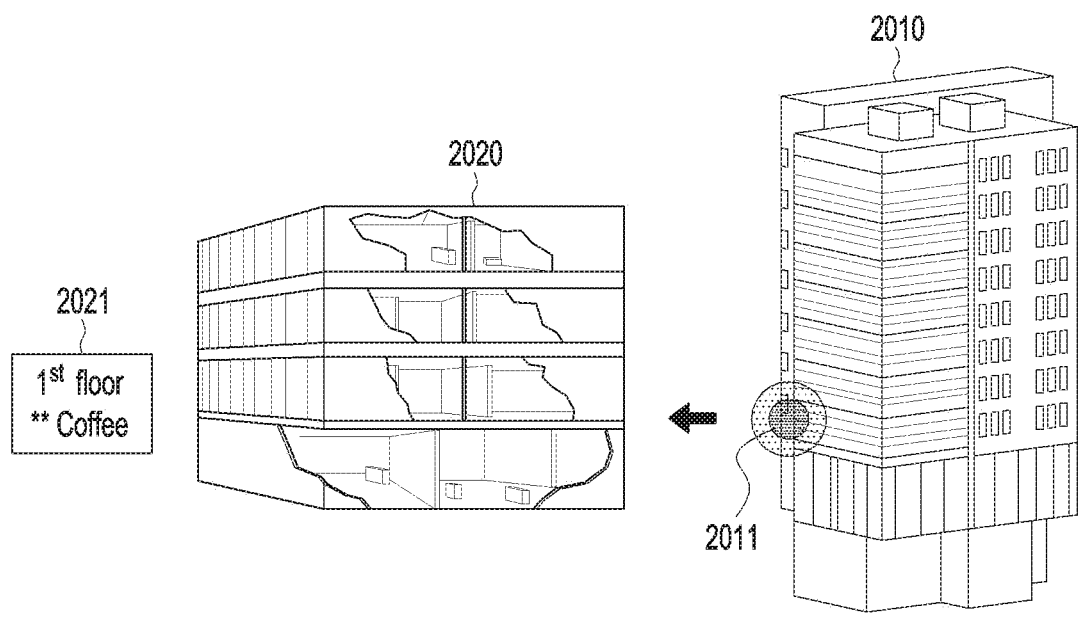
FIG. 20 illustrates an example of detailed information of a building on the basis of a pressure input when an object is the building according to an embodiment.

FIG. 20 illustrates an example of detailed information of a building on the basis of a pressure input when an object is the building according to an embodiment.

Referring to FIG. 20, an electronic device (for example, the processor 120) may display detailed information of a building 2010 (for example, names of stores located on each floor) or an interior 2020 in accordance with a pressure input 2011 on a display (for example, the display 160 of FIG. 1). The detailed information of the building may include various pieces of information for each floor (for example, a steel-frame structure and a store name). The detailed information may be provided to the electronic device 101 after an authentication process by a server (for example, the server 106 of FIG. 1). The interior 2020 may include an internal image of the building 2010, and the internal image may be provided to the electronic device 101 after an authentication process by the server (for example, the server 106 of FIG. 1). For example, when the pressure input 2011 is detected on the building 2010 in the state in which the building 2010 including various stores is displayed on a display (for example, the display 160 of FIG. 1), names, addresses, sizes, or real estate information of the various stores in the detected building 2010 may be displayed.

Figure 21A:
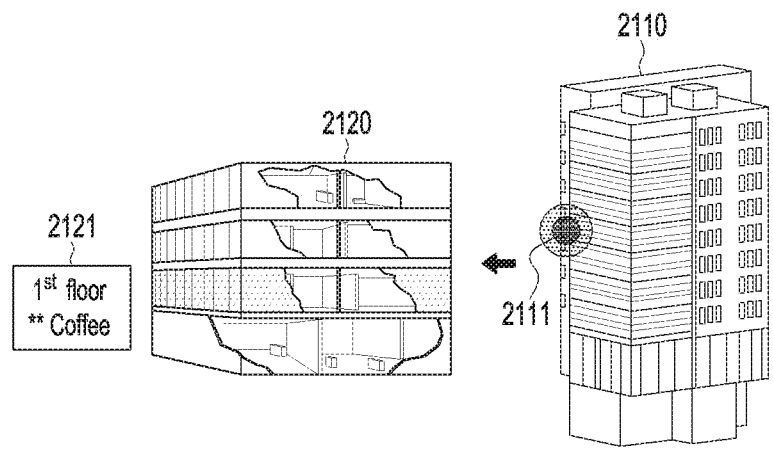
FIGS. 21A to 21C illustrate examples of displaying detailed information of each floor of a building on the basis of an intensity of a pressure input when an object is the building according to an embodiment.
Figure 21B:
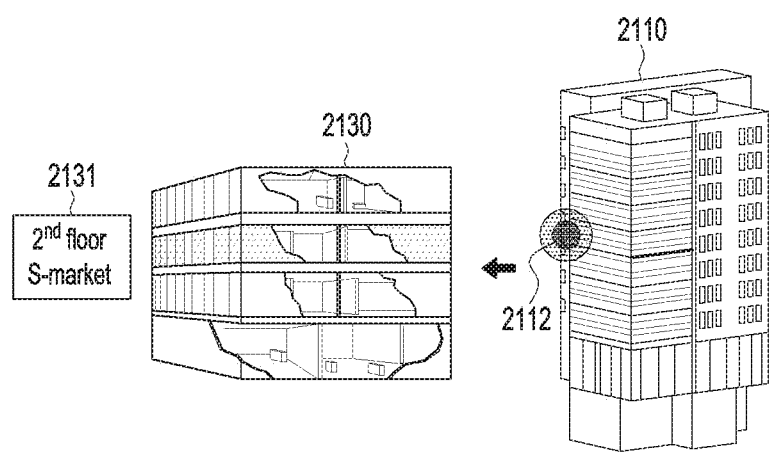
Figure 21C:
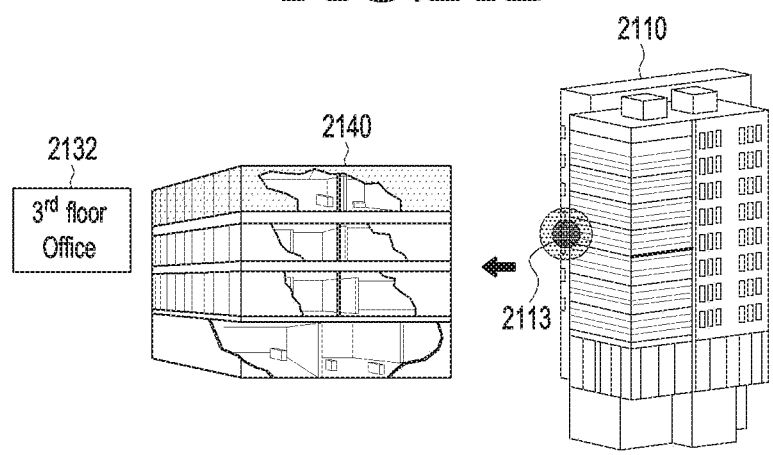

FIGS. 21A to 21C illustrate examples of displaying detailed information of each floor of a building on the basis of an intensity of a pressure input when an object is the building according to an embodiment.

Referring to FIGS. 21A to 21C, an electronic device (for example, the processor 120) according to an embodiment may display detailed information of each floor of a building 2110 (for example, a name of a store located on each floor) or interiors on floors 2120, 2130, and 2140 on a display (for example, the display 160 of FIG. 1) in accordance with an intensity of a pressure input. The detailed information of the building may include various pieces of information for each floor (for example, a steel-frame structure and a store name). A request for the detailed information may be made to a server (for example, the server 106 of FIG. 1) by the electronic device 101, and the detailed information may be provided to the electronic device 101 after an authentication process by the server (for example, the server 160 of FIG. 1). The interiors 2120, 2130, and 2140 may include an internal image of the building 2110, and the internal image may be provided to the electronic device 101 after an authentication process by the server (for example, the server 160 of FIG. 1).

For example, when a first pressure input 2111 is made on the building as illustrated in FIG. 21A, the electronic device (for example, the processor 120) may display the interior 2120 (for example, a steel-frame structure or an internal image of a first floor) and detailed information 2121 (for example, a name of a store on the first floor) on a floor (for example, first floor) corresponding to the first pressure input 2111. In another example, when a second pressure input 2112 is made on the building as illustrated in FIG. 21B, the electronic device (for example, the processor 120) may display the interior 2130 (for example, a steel-frame structure or an internal image of a second floor) and detailed information 2131 (for example, a name of a store on the second floor) on a floor (for example, second floor) corresponding to the second pressure input 2112. In still another example, when a third pressure input 2113 is made on the building as illustrated in FIG. 21C, the electronic device (for example, the processor 120) may display the interior 2140 (for example, a steel-frame structure or an internal image of a third floor) and detailed information 2132 (for example, a name of a store on the third floor) on a floor (for example, third floor) corresponding to the third pressure input 2113. For example, the intensity of the second pressure input 2112 may be higher than the intensity of the first pressure input 2111, and the intensity of the third pressure input 2113 may be higher than the intensity of the second pressure input 2112. In another example, the intensity of the second pressure input 2112 may not be higher than the intensity of the first pressure input 2111, and the intensity of the third pressure input 2113 may not be higher than the second pressure input 2112. Movement between respective floors may be performed by the intensity or position of the pressure input followed by the selection of the building 2110.

Figure 22A:
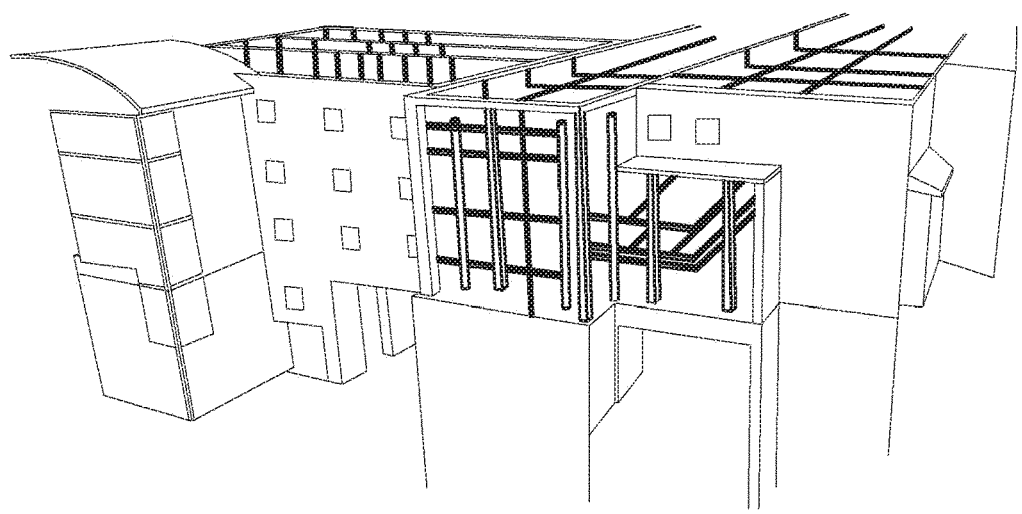
FIG. 22A illustrates an example of displaying detailed information of each floor of a building when an object is the building according to an embodiment.

FIG. 22A illustrates an example of displaying detailed information of each floor of a building when an object is the building according to an embodiment.

Referring to FIG. 22A, an electronic device (for example, the processor 120) according to an embodiment may display an interior or a steel-frame structure of each floor of the building on a display (for example, the display 160 of FIG. 1) in accordance with the intensity of the pressure input. A request for the detailed information may be made to a server (for example, the server 106 of FIG. 1) by the electronic device 101, and the detailed information may be provided to the electronic device 101 after an authentication process by the server (for example, the server 160 of FIG. 1). The detailed information such as the steel-frame structure may be provided to an owner of the building, a superintendent of the building, or an employee working in the building. For example, when the owner of the building, the superintendent of the building, or the employee working in the building makes a pressure input on the building, the electronic device 101 may transmit an identifier of the user of the electronic device 101 to the server (for example, the server 106 of FIG. 1) and the server (for example, the server 106 of FIG. 1) may receive the identifier. The server (for example, the server 106 of FIG. 1) may perform an authentication process to identify whether the user corresponding to the received identifier can acquire detailed information of the building and provide the detailed information to the user having completed the authentication. For example, displaying the interior or the steel-frame structure may be performed by the position or intensity of an input of a gesture followed by the pressure input for selecting the building. For example, when pressure is applied to a specific position again after movement of the touch input to a detailed image, the electronic device 101 may display detailed information of the corresponding position. For example, a wall or a pillar may be perspectively displayed when the first pressure input is made, and a detailed layout structure may be enlargely displayed when the second pressure input is made.

Figure 22B:
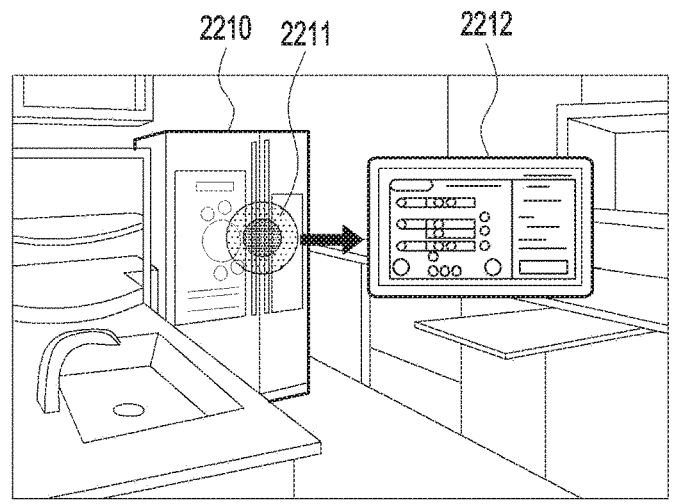
FIG. 22B illustrates an example of displaying a preset function on the basis of a pressure input on a refrigerator when an object is the refrigerator according to an embodiment.
Figure 22C:
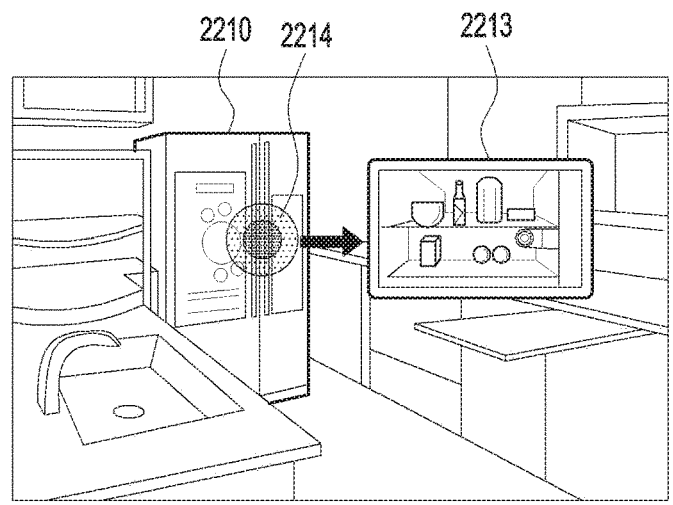
FIG. 22C illustrates an example of displaying an image inside a refrigerator on the basis of a pressure input on the refrigerator when an object is the refrigerator according to an embodiment.

FIG. 22B illustrates an example of displaying a preset function on the basis of a pressure input on a refrigerator when an object is the refrigerator according to an embodiment, and FIG. 22C illustrates an example of displaying an image inside the refrigerator on the basis of the pressure input on the refrigerator when an object is the refrigerator according to an embodiment.

Referring to FIGS. 22B and 22C, a refrigerator 2210 may communicate with other home appliances (for example, a washing machine, a dishwasher, and a microwave oven). When a pressure input 2211 is made on the refrigerator 2210, the electronic device 101 may display a screen 2212 (for example, a dash board) showing at least one preset function of the refrigerator 2210. For example, when the first pressure input 2211 is made on the refrigerator 2210, the electronic device 101 may display the screen 2212 showing at least one function such as a preset function for providing communication between the refrigerator 2210 and at least one home appliance, a function of controlling temperature of the refrigerator 2210, and a function of controlling power on/off. In another example, when a second pressure input 2214 is made on the refrigerator 2210, the electronic device 101 may display an internal image 2213 of the refrigerator 2210. The internal image 2213 may include information on foods stored in the refrigerator 2210 (for example, an expiration date, a manufactured date, and a manufacturing company). The information on the foods may be input in advance by the user or may be acquired from the server 106. FIGS. 22B and 22C are merely described for the refrigerator but this is not limited thereto. The present invention can be applied to a light, a washing machine, a boiler, or an air-conditioner as well as the refrigerator.

Although FIGS. 10 to 22 illustrate controlling the object, performing the function, or displaying additional information according to the pressure input made on the desired object in the image including at least one object, the operation of the electronic device 101 may be controlled by the existence or non-existence, the number, or the intensity of inputs (for example, squeeze) of pressing a specific button of the electronic device 101 as well as the pressure input made on the object in the displayed image in the disclosure. For example, when the electronic device 101 outputs a question to the user, if an input of squeezing a specific button (for example, a power button located on a side surface) is detected once, the electronic device 101 may determine that the user makes a positive response. When the input of squeezing the specific button is detected twice, the electronic device 101 may determine that the user makes a negative response. As described above, according to various embodiments of the disclosure, the electronic device 101 may be controlled not only by the pressure input made on the object in the image displayed on the touch screen display 730 but also by the pressing of the button formed on one side of the electronic device 101.

According to various embodiments, a method of controlling an operation according to a level of a pressure input by an electronic device may include an operation of displaying at least one object in a user interface on a touch screen display of the electronic device, an operation of detecting a pressure level of a user input on or around the at least one object, and an operation of selecting one of a plurality of operations related to the at least one object, based on at least a portion of the detected pressure level.

According to an embodiment, the method may further include an operation of displaying a plurality of adjacent objects on the touch screen display and an operation of selecting one or more objects on the basis of a position of the user input and at least a portion of the detected pressure level.

According to an embodiment, the method may further include an operation of determining a plurality of objects corresponding to the detected pressure level and an operation of selecting one of the determined plurality of objects.

According to an embodiment, an object having deep depth information from the determined plurality of objects may be selected in proportion to a size of the detected pressure level.

According to an embodiment, pairing may be performed between the determined plurality of objects.

According to an embodiment, pairing may be performed between the selected object and the electronic device.

According to an embodiment, attributes of at least one of the selected object or objects which are not selected may be determined among the determined plurality of objects.

According to an embodiment, the image may be changed and displayed on the basis of the determined attributes.

According to an embodiment, at least one of enlarging a size of the selected object at a predetermined magnitude and displaying the object, changing a color of the selected object and displaying the object, transparently displaying remaining parts except for boundaries of the objects which are not selected, or translucently displaying the objects which are not selected may be performed.

According to an embodiment, when a number of user inputs is at least two, one of the plurality of objects may be more rapidly selected than a case in which the number of user inputs is one.

According to an embodiment, a menu including at least one function related to the selected object may be displayed in accordance with a position at which the selected object is displayed.

According to an embodiment, additional information corresponding to the selected object may be displayed in accordance with a position at which the selected object is displayed.

According to an embodiment, when there is no additional information in the memory, a request for additional information corresponding to the selected object is made to a server, and the additional information is received in response to the request.

According to an embodiment, when a request for information for authenticating the electronic device is received from the server, an identifier of the electronic device may be transmitted to the server in response to the request, and when the authentication is completed, the additional information is received from the server.

The term "module" as used herein may include a unit including hardware, software, or firmware, and may, for example, be used interchangeably with the term "logic", "logical block", "component", "circuit", or the like. The "module" may be an integrated element, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a compiler or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

The invention claimed is:

1. An electronic device comprising:
   a housing comprising a first plate and a second plate separated from the first plate;
   a touch screen display disposed within the housing and exposed through a portion of the first plate;
   a pressure detection circuit disposed between the first plate and the second plate and configured to detect pressure by external pressure applied to at least a portion of the touch screen display;
   a wireless communication circuit disposed within the housing;
   at least one processor disposed within the housing and electrically connected to the touch screen display, the pressure detection circuit, and the wireless communication circuit; and
   a memory disposed within the housing and electrically connected to the processor,
   wherein the memory is configured to store an application comprising a user interface and instructions,
   wherein the instructions are configured to cause the processor to:
   display a plurality of objects in the user interface on the touch screen display;
   detect a pressure level of a user input on or around the plurality of objects through the pressure detection circuit;
   identify, from among the plurality of objects, a first object corresponding to the pressure level of the user input; and
   in response to identifying the first object:
     change visual attributes of second objects, except for the first object, from among the plurality of objects, and
     identify one of a plurality of operations related to the first object.

2. The electronic device of claim 1, wherein the instructions are configured to cause the processor to identify the first object having deep depth information from among the plurality of objects in proportion to a size of the detected pressure level.

3. The electronic device of claim 1, wherein the instructions are configured to cause the processor to perform pairing of the plurality of objects.

4. The electronic device of claim 1, wherein the instructions are configured to cause the processor to perform pairing of the first object and the electronic device.

5. The electronic device of claim 1, wherein the instructions are configured to cause the processor to translucently display the second objects.

6. The electronic device of claim 1, wherein, when a number of user inputs is at least two, the instructions are configured to cause the processor to more rapidly identify one of the plurality of objects than a case in which the number of user inputs is one.

7. The electronic device of claim 1, wherein the instructions are configured to cause the processor to display a menu comprising at least one function related to the first object in accordance with a position at which the first object is displayed.

8. The electronic device of claim 1, wherein the instructions are configured to cause the processor to display additional information corresponding to the first object in accordance with a position at which the first object is displayed.

9. A method of controlling an operation according to a level of a pressure input by an electronic device, the method comprising:
  displaying a plurality of objects in a user interface on a touch screen display of the electronic device;
  detecting a pressure level of a user input on or around the plurality of objects;
  identifying, from among the plurality of objects, a first object corresponding to the pressure level of the user input; and
  in response to identifying the first object:
    changing visual attributes of second objects, except for the first object, from among the plurality of objects, and
    identifying one of a plurality of operations related to the first object.

10. The method of claim 9, wherein identifying the first object comprises identifying the first object having deep depth information from among the plurality of objects in proportion to a size of the detected pressure level.

11. The method of claim 9, further comprising:
  performing pairing of the first object and the electronic device.

12. The method of claim 9, wherein changing the visual attributes of second objects comprises translucently displaying the second objects.

13. The method of claim 9, wherein the one of a plurality of operations comprises displaying a menu comprising at least one function related to the first object in accordance with a position at which the first object is displayed.

14. The method of claim 9, wherein the one of a plurality of operations comprises displaying additional information corresponding to the first object in accordance with a position at which the first object is displayed.

15. A non-transitory computer-readable storage medium for storing a program comprising instructions that, when executed by a processor of an electronic device, cause the processor to perform:
  displaying a plurality of objects in a user interface on a touch screen display of the electronic device;
  detecting a pressure level of a user input on or around the plurality of objects;
  identifying, from among the plurality of objects, a first object corresponding to the pressure level of the user input; and
  in response to identifying the first object:
    changing visual attributes of second objects, except for the first object, from among the plurality of objects, and
    identifying one of a plurality of operations related to the first object.

16. The non-transitory computer-readable storage medium of claim 15, wherein identifying the first object comprises identifying the first object having deep depth information from among the plurality of objects in proportion to a size of the detected pressure level.

17. The non-transitory computer-readable storage medium of claim 15, wherein the instructions cause the processor to:
  perform pairing of the first object and the electronic device.

18. The non-transitory computer-readable storage medium of claim 15, wherein changing the visual attributes of second objects comprises translucently displaying the second objects.

19. The non-transitory computer-readable storage medium of claim 15, wherein the one of a plurality of operations comprises displaying a menu comprising at least one function related to the first object in accordance with a position at which the first object is displayed.

20. The non-transitory computer-readable storage medium of claim 15, wherein the one of a plurality of operations comprises displaying additional information corresponding to the first object in accordance with a position at which the first object is displayed.

* * * * *